United States Patent [19]

Kimmel

[11] Patent Number: 4,811,413

[45] Date of Patent: Mar. 7, 1989

[54] SYSTEM OF RECONFIGURABLE PIPELINES OF GENERALIZED NEIGHBORHOOD FUNCTION MORPHIC IMAGE PROCESSORS

[75] Inventor: Milton J. Kimmel, Yorktown Heights, N.Y.

[73] Assignee: International Business Machines Corp., Armonk, N.Y.

[21] Appl. No.: 112,658

[22] Filed: Oct. 22, 1987

[51] Int. Cl.[4] .............................................. G06K 9/36
[52] U.S. Cl. ........................................ 382/41; 382/49
[58] Field of Search .................................... 382/49, 41

[56] References Cited

U.S. PATENT DOCUMENTS

| | | | |
|---|---|---|---|
| 3,959,777 | 5/1976 | Kimmel | 340/172.5 |
| 4,001,787 | 1/1977 | Kimmel | 340/172.5 |
| 4,011,547 | 3/1977 | Kimmel | 340/172.5 |
| 4,322,812 | 3/1982 | Davis et al. | 364/900 |
| 4,357,624 | 11/1982 | Greenberg | 358/22 |
| 4,369,430 | 1/1983 | Sternberg | 340/146.3 |
| 4,380,046 | 4/1983 | Fung | 364/200 |
| 4,395,700 | 7/1983 | McCubbrey et al. | 382/27 |
| 4,449,195 | 5/1984 | Andrews et al. | 364/900 |
| 4,484,349 | 11/1984 | McCubbrey | 382/49 |
| 4,491,932 | 1/1985 | Ruhman et al. | 364/900 |
| 4,510,616 | 4/1985 | Lougheed | 382/8 |
| 4,541,114 | 9/1985 | Rutenbar | 382/8 |
| 4,551,816 | 11/1985 | Hyatt | 364/724 |
| 4,590,607 | 5/1986 | Kauth | 382/41 |

OTHER PUBLICATIONS

D. R. Andrews et al, "The IBM 1975 Optical Page Reader, Part III, Recognition Logic Development", IBM Journal of Research and Development, Sep. 1986, pp. 364-371.

M. J. Kimmel, "PRIME-A Processor Design for Character Recognition".

ACM SigMicro6 Preprint, Sep. 24-25, 1973, pp. 106-112.

M. J. Kimmel et al, "MITE: Morphic Image Transform Engine, An Architecture for Reconfigurable Pipelines to Neighborhood Processors", 1985 IEEE Computer Society Workshop on Computer Architecture for Pattern Analysis and Image Database Management, (Cat. No. 85CH2229-3), IEEE, 1985, Miami Beach, FL, 18-20 Nov. 1985.

D. E. Shaw et al, "The Multiple-Processor PPS Chip of the NON-VON3 Supercomputer Integration", VLSI J. (Netherlands), vol. 3, pp. 161-174.

L. Van Eycken, "A Reconfigurable Multiprocessor Structure for Image Processing", 1983 5EEE Computer Society Workshop on Computer Architecture for Pattern Analysis and Image Database Management Proceedings, IEEE, Oct. 1983, Pasadena, CA, 12-14 Oct. 1983.

A. J. Kessler, "Reconfigurable Parallel Pipelines for Fault Tolerance", IEEE International Conference on Circuits and Computers, ICCC 82, IEEE, 1982, New York, 28 Sep.-1 Oct. 1982.

K. Preston, Jr., "Feature Extraction by Golay Hexagonal Pattern Transforms", IEEE Transaction on Computers, vol. C-20, No. 9, Sep. 1971.

Primary Examiner—Theodore M. Blum
Attorney, Agent, or Firm—Philip J. Feig

[57] ABSTRACT

A system of reconfigurable pipelines of generalized neighborhood function morphic image processors provides image transformations. An input image pixel stream is provided to one or more reconfigurable processing element groups comprising reconfigurable delay RAMs, reconfigurable neighborhood function RAMs, and reconfigurable window selection switching in order to achieve general neighborhood window function morphic image transformations. The described arrangement is amenable to VLSI packing implementation without loss of the reconfigurability or flexibility of the morphic image processor.

17 Claims, 18 Drawing Sheets

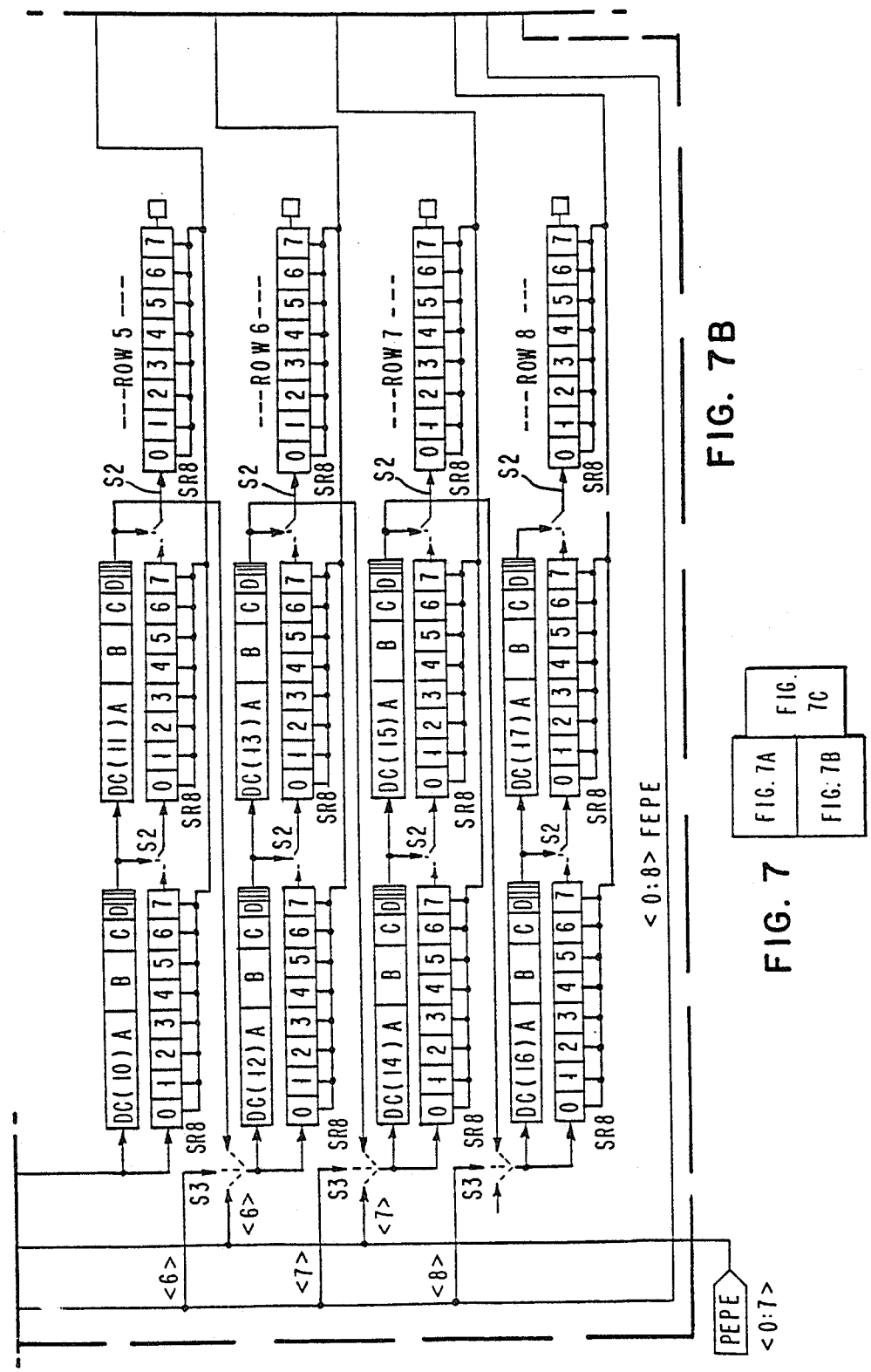

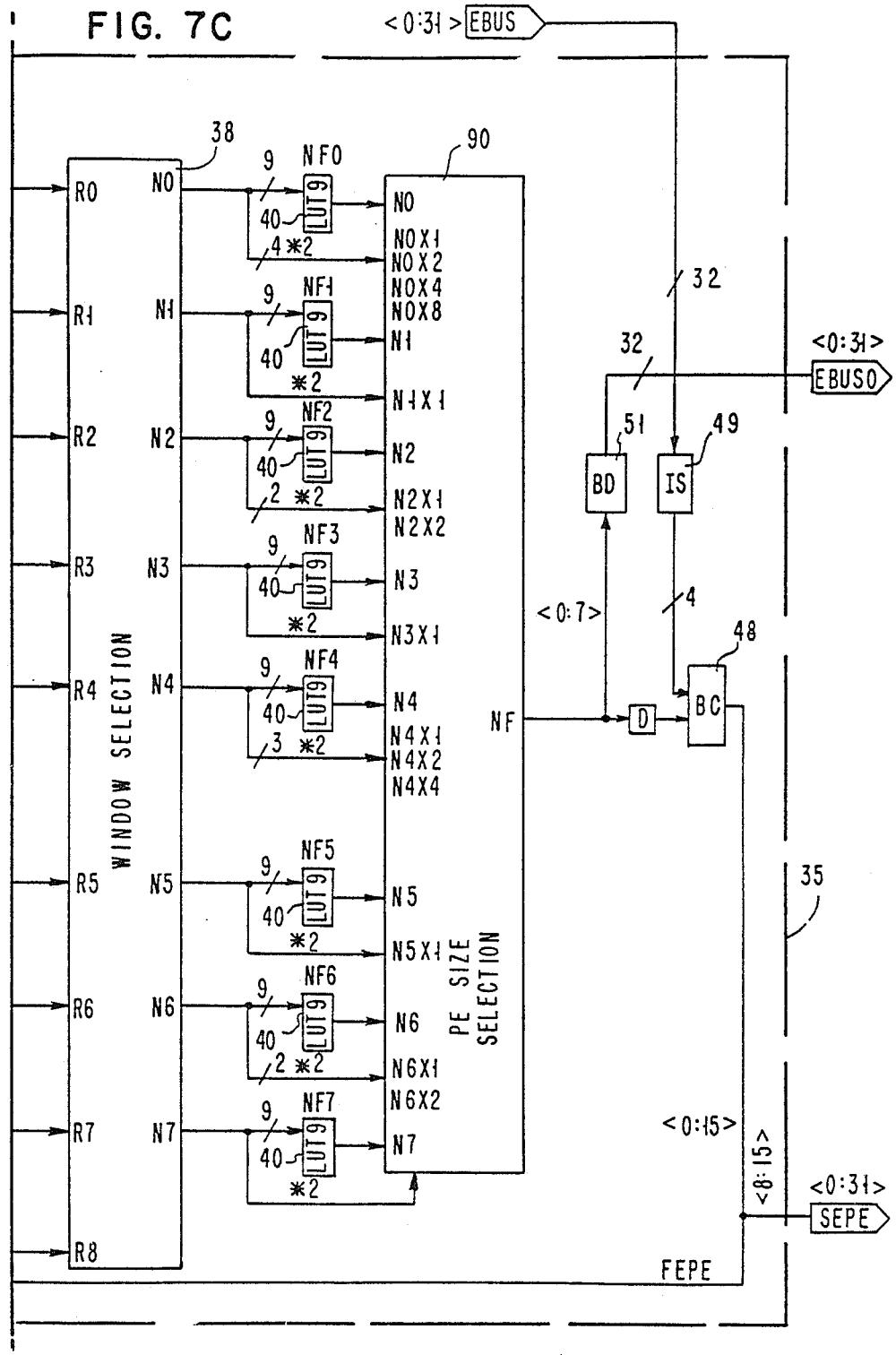

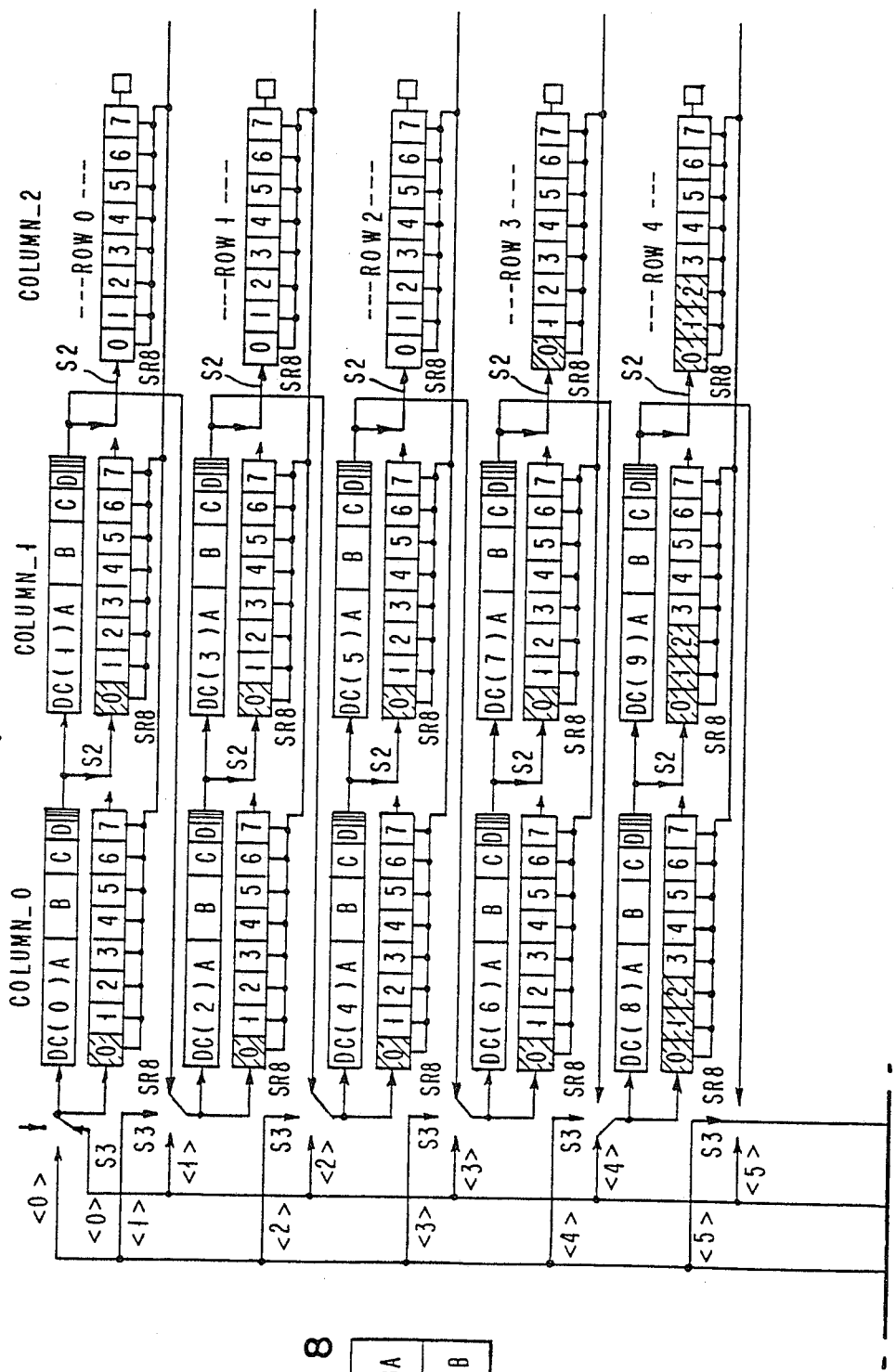

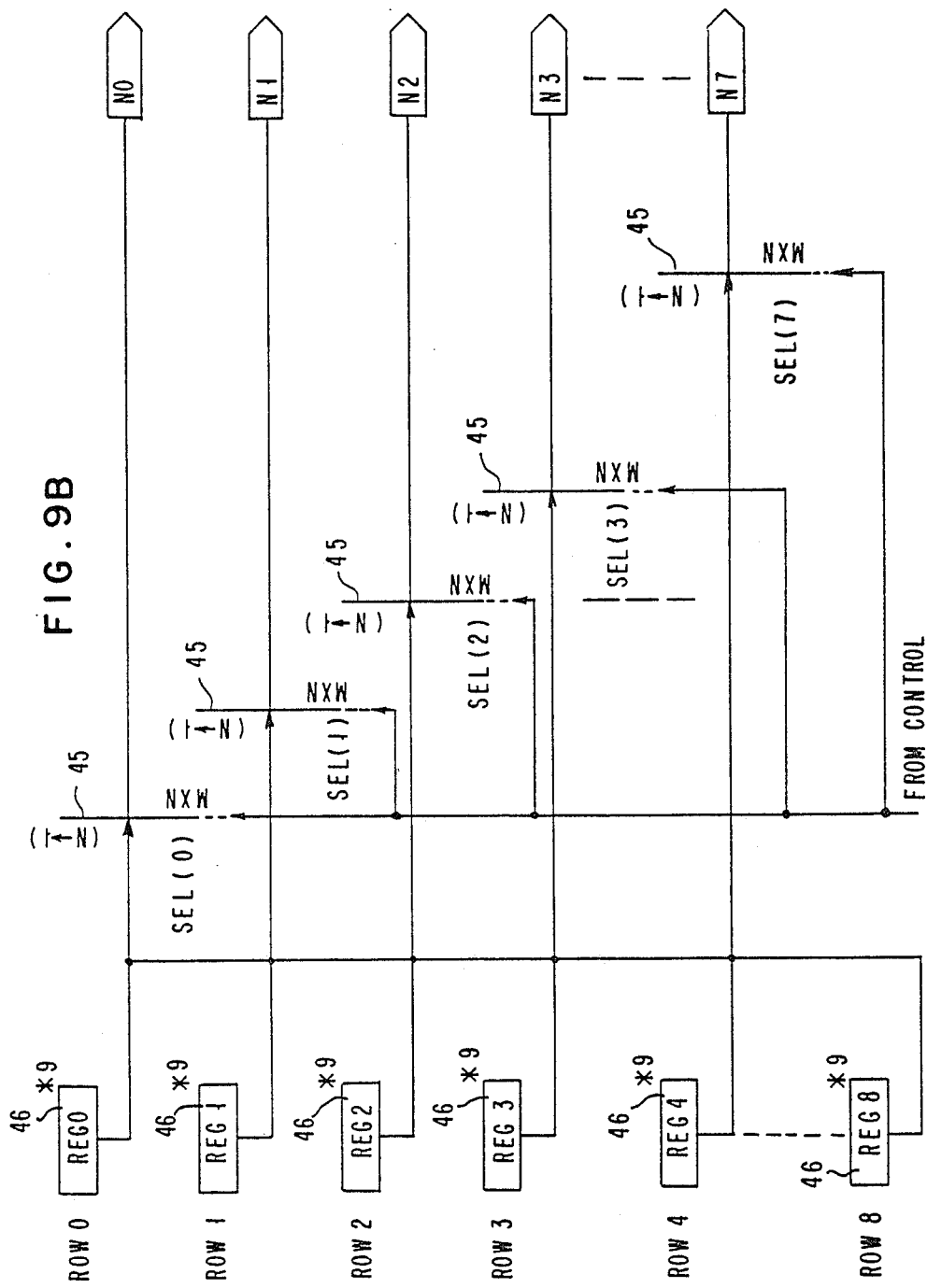

SYSTEM OF RECONFIGURABLE PIPELINES OF GENERALIZED NEIGHBORHOOD FUNCTION MORPHIC IMAGE PROCESSORS

BACKGROUND OF THE INVENTION

The present invention relates to reconfigurable pipeline image processing systems and more particularly to processing systems utilizing arbitrary neighborhood window processing.

The binary neighborhood window processing capability of pipeline image processors is extended to handle arbitrary window functions, thereby enabling a greater variety of morphic structuring elements to be implemented in a single processing element. As a result, complete morphic algorithms are performed with fewer steps and hence, fewer processing elements.

In prior art systems, such as MITE (Morphic Image Transform Engine), only a certain class of image neighborhood windows were capable of being processed. The MITE system is described in "MITE: Morphic Image Transform Engine An Architecture for Reconfigurable Pipelines of Neighborhood Processors" by M. J. Kimmel et al, 1985 IEEE Computer Society Workshop on Computer Architecture for Pattern Analysis and Image Database Management, Nov. 18-20, 1985, Miami Beach, Fla., and in patent application Ser. No. 06/759,640, filed July 26, 1985.

The MITE system is a reconfigurable arrangement of processing elements which process binary neighborhood window images concurrently in a parallel pipeline manner. Heretofore, neighborhood processors were generally limited to a neighborhood comprising a three pixel by three pixel square array of nearest neighbors. This limitation is particularly applicable in concurrent serial pipeline systems where speed and synchronization of the image processing is a foremost criteria.

In certain applications, a different neighborhood is preferable as a processing element in morphic processing. For example, to reduce an image to a smaller and smaller scale, the following approach may be used. The data is smoothed by taking an averaging or majority function over a two pixel by two pixel square window. The smoothed data is then processed by a window which uses every other pixel (for three pixels) in every other row (for three rows). One-fourth of the neighborhood transformations will be of no interest because of the previous smoothing processing, but every other pixel in every other row will be the result at half scale. The same sequence may be done iteratively, each iteration reducing the scale by a factor of two. With each iteration, the bits of interest will be reduced by a factor of four and the spatial relationship between pixels in the processing window will double in separation, hence requiring a different neighborhood or window each iteration.

Other image processing applications, including optical character recognition, use binary feature extraction which is related to neighborhood window processing, except that each feature or measurement sought usually requires a different set of input pels (window) to the process. Examples of different spatial relationships between bits of the feature (window) are shown in the article "The IBM 1975 Optical Page Reader Part III: Recognition Logic Development" by D. R. Andrews et al, IBM Journal of Research and Development, September, 1968, pp. 364-371. The described application can also require varying quantities of elements comprising the window.

In the past the generation of different windows has been achieved in several ways. Hardwired combinational logic implementation with shift registers which rotate the image for processing is an inflexible approach. Also, general purpose computers can simulate the extraction of this information. However, while such an arrangement is very flexible, it is also very slow. Neighborhood windows can also be implemented in special purpose image processing processors such as PRIME. The PRIME system is described in the article "PRIME -- A Processor Design for Character Recognition" by M. J. Kimmel, ACM SigMicro6 Preprint, Sept. 24-25, 1973, pp. 106-112.

Additional prior art relating to the PRIME system is found in U.S. Pat. Nos. 3,959,777 to Kimmel; 4,001,787 to Kimmel; and 4,011,547 to Kimmel. While the prior art approaches using a processor are quite general, it is also relatively slow and not well suited to serial synchronous reconfigurable pipeline processors. In these systems, each neighbor transformation or feature extraction takes a variable amount of time depending upon the complexity of the logic of the neighborhood function. This is so because the program running time is data dependent even though the parallelism of the PRIME system enables the neighborhood function to be calculated for more than one shift position at a time.

There are many other prior art pipeline image processing systems utilizing neighborhood transformations. Typical of the prior art is U.S. Pat. No. 4,395,700 to McCubbrey et al, in which a RAM serves as a recirculating line storage device for accommodating different raster scan line lengths in order to sufficiently access the neighborhood window for analysis. The described window is limited to a conventional M pixel by N pixel square array of neighbors.

Other known systems include neighborhood functions comprising other than nine pixels in a fixed spatial relationship. One such system known as the Golay hexagonal pattern transform is described in the article "Feature Extraction by Golay Hexagonal Pattern Transforms" by Kendall Preston, Jr. IEEE Transactions on Computers, Vol C-20, No. 9, September, 1971, pp. 1007-1014.

SUMMARY OF THE INVENTION

A generalized neighborhood function processor calculates one N bit generalized neighborhood function signal per referenced pixel at the same pixel rate as the image is scanned, each new image pixel scanned becomes a pixel in a new image which, in turn, is transformed by a subsequent generalized neighborhood function. In the present invention, a morphic image transformation is generated each pixel time from a preordered or preselected group of bits rather than the eight or six nearest neighbors of the prior art morphic transform systems. A very arbitrary or general neighborhood selection and computation function, operating at image pixel rate, programmable or reconfigurable and amenable to VLSI packaging is described.

Every binary neighborhood image processing element must be able to perform a logical function on some pixels of the image. The pixels are selected by providing delay between desired pixels, and by varying the delays as a function of the pixel offset, which offset is dependent upon the image width. In the present invention both the delay function and the logical function are programmable variables, configuring the delay hardware and look-up hardware to perform the desired image operation. A fixed amount of RAM results in a variable quantity of processing elements, which quantity is dependent upon the complexity of the neighborhood operation. Such an embodiment can be realized in high density VLSI, thereby reducing the size and cost of the hardware.

The MITE system provides a method for obtaining a reconfigurable network of reconfigurable neighborhood functions having constraints concerning selection of the neighborhood. The present invention expands the MITE system to realize any generalized neighborhood or window function of predetermined quantity and spatial relationships of pixels without losing any of the function or flexibility obtained in the MITE system.

A principal object of the invention is, therefore, the provision of a reconfigurable binary neighborhood window image processor comprising a reconfigurable network of reconfigurable neighborhood functions and reconfigurable windows, in which any generalized neighborhood or window function of predetermined quantity and spatial relationships of pixels is capable of being configured.

It is an object of the invention to provide interconnection between the processing elements comprising the network, the specific logic function of each processing element, and the delays which both configure the processing elements to the image width and provide a generalized window as a variable. Thus, a combination of RAM memory for achieving delays and RAM memory for logic lookup function are employed in conjunction with each processing element. RAM memory is also used for configuring the network which interconnects the processing element.

Another object of the invention is the provision of serially synchronous pipelines of neighborhood processing elements programmably reconfigurable so that each processing element is capable of processing a different generalized neighborhood function, thereby greatly increasing and enhancing the utility of the overall system.

A further object of the invention is the realization of the invention in high density VLSI circuits, thereby reducing overall size and cost of implementation.

Further and still other objects of the invention will become more clearly apparent when the following description is read in conjunction with the accompanying drawings.

BRIEF DESCRIPTION OF THE DRAWINGS

FIG. 7 illustrates how FIGS. 7A, 7B, and 7C are combined to provide a schematic representation of a multiple quantity of general neighborhood circuits with the associated switching functions which comprise a processing element group;

FIG. 8 illustrates how FIGS. 8A and 8B are combined to provide a schematic representation of a portion of the circuit of FIG. 7 with certain shift register positions comprising neighborhood windows indicated;

FIGS. 9A and 9B are schematic representations of portions of the window selection circuit;

FIG. 10 illustrates how

DETAILED DESCRIPTION

In the MITE system, the switching necessary in order to provide reconfigurable networks of processing elements by means of boolean combiner memory and reconfigurable neighborhood functions by means of logic table look-up memory is known. The present invention extends the prior capabilities to provide reconfiguring of the elements comprising different RAM memory in each processing element for varying the quantity of pixels comprising the neighborhood function and the spatial relationship between the pixels.

In accordance with the invention, in a generalized neighborhood window for providing selected input to a neighborhood function processing element having a predetermined size of delay memory, the image width becomes the limiting factor in the generating of neighborhood windows.

In the description below, the neighborhood window will be described as a nine pel window solely for the reason that many existing pipeline processors use a three by three square array window comprising nine pels. The invention, however, is applicable to neighborhood windows comprising any quantity of pels, more or less than nine, limited primarily by the size of the memory and the span of the window. The span of the window being defined as the total quantity of pixels between the first neighbor and the last neighbor of the neighborhood.

Figure 1:
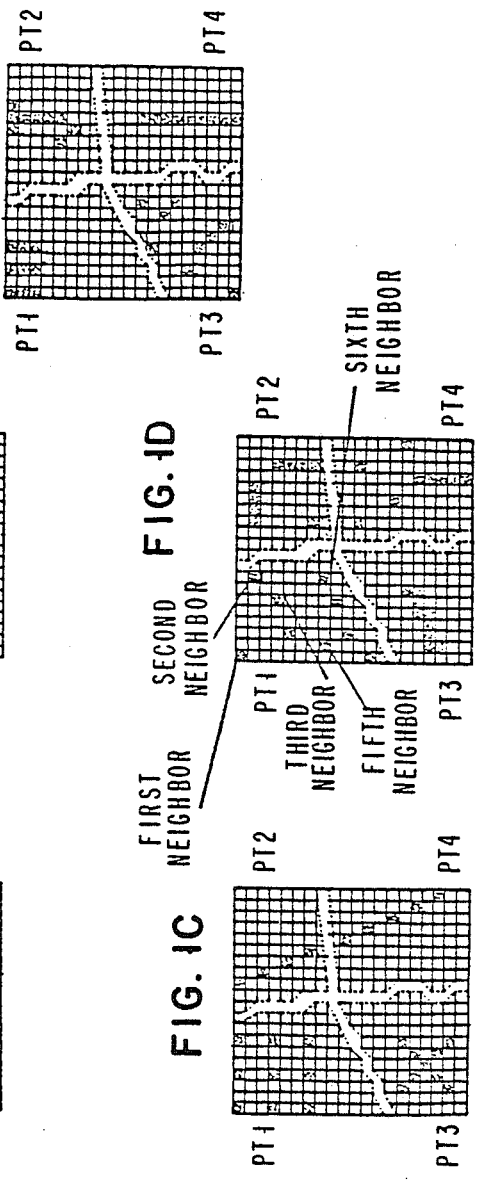
FIGS. 1A–1E are graphical representations of generalized neighborhoods.

Referring now to the figures, and in particular to FIGS. 1A through 1E which illustrate several generalized neighborhood windows. Each FIGS. 1A to 1E illustrates four separate neighborhood window patterns PT1, PT2, PT3 and PT4. The pixels representing the neighborhood window are shown as shaded. Other non-window pixels are shown as white boxes. The window shown in PT1 of FIG. 1A is a conventional three by three square nine pel array. In the MITE system, there is a restriction imposed upon the neighborhood window that neighbors must be selected in sets of three immediately adjacent horizontal pels, each set of three being equidistant from each other and separated by at least nine pels. FIG. 1A shows examples of such neighborhood windows.

A window such as the one shown in PT1 of FIG. 1B does not meet the foregoing criteria because each set of these pels is not equally spaced in the image. In PT2 of FIG. 1B the three pels in each set are not immediately adjacent and therefore a window of the type shown would also fail to meet the criteria. Whereas in PT3 of FIG. 1B there is no minimum spacing or separation between sets. Similar differences are found in each of the windows shown in FIGS. 1B, 1C, 1D and 1E rendering present image processors incapable of processing image data in each of the windows shown.

In the worst case, a neighborhood window of the type shown in PT1 of FIG. 1D, comprising completely randomly spaced pels, is the desired neighborhood window. In accordance with the invention, a window of such random pels is generated by the inclusion of delays between pixels utilizing minimal RAM memory to provide the delays.

In prior image processors, image data is sequentially shifted to the neighborhood function logic processor by means of a shift register. Alternative known methods include the use of variable length shift registers, tapped delay lines or a suitably programmed memory.

Figure 2:
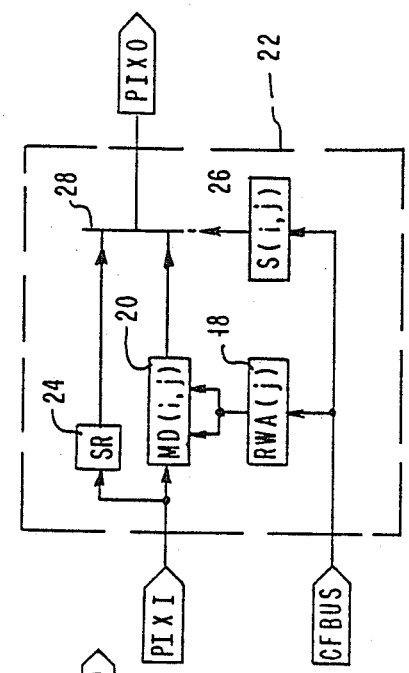
FIG. 2 is a schematic representation of a programmable delay circuit.

FIG. 2 shows a known programmable delay 10 used in generating a portion of a conventional neighborhood window. A write address (WAD) 12 and a read address (RAD) 14 of a memory (MEM) 16 cause the memory 16 to store incoming pixel stream PIXI sequentially, one pixel per pixel acquisition time. The write address 12 controls the location where the next pixel is written and the read address 14 controls from which memory location the next pixel PIXO is read out. Both the write address 12 and read address 14 are incrementing counters which are incremented each pixel acquisition time.

The predetermined difference between the write address and read address contents determines the time delay or spatial offset between the writing in of the pixel and subsequent reading out of the same pixel.

If the incoming pixel PIXI is written before the outgoing pixel PIXO is read, then the delay is 1+(WAD−RAD). If WAD−RAD is zero, that is, the same pixel written in is immediately read out, the delay is one pel time for cycling the memory. Alternatively, if the outgoing pixel is read out before the incoming pixel is written in, then the delay is still 1+(WAD−RAD), but if WAD−RAD is zero, the delay is one cycle time greater than the size of the memory 16 since the pixel being read out was written into the memory location the previous time that the write address 12 cycled that memory location address.

The programmable delay 10 shown in FIG. 2 can be utilized to implement any delay from one to one plus the memory word size in a programmable manner.

The CFBUS input to the programmable delay 10 is used to initialize the write address and read address counter.

The generation of the input image pixel (PIXI) signal is well known to those skilled in the art and therefore is not discussed in any detail. The method of personalization of a system by sending information along a general bus to load RAM and switches is discussed, for instance, in patent application Ser. No. 06/759,640 and is well known to those skilled in the art.

The preferred embodiment of the invention provides programmable and relocatable units of delays as described below which reduces excess delay memory and reduces the accessing hardware for addressing the delay memories.

It is possible using the basic element of the programmable delay 10 to generate any neighborhood window function in which each pel in the neighborhood is offset from the other pels in the neighborhood by any amount from 1 to 1+n positions.

Figure 3:
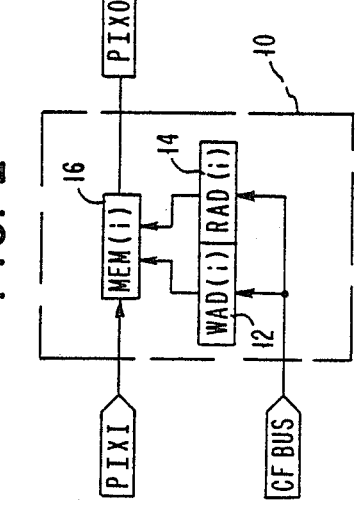
FIG. 3 is a schematic representation of a delay stage circuit.

It is possible to build a delay only equal to either 1 or $1+2^k$ using less hardware than that used in the programmable delay of FIG. 2. In FIG. 3, the two addresses 12, 14 are replaced by a single read write address register (RWA) 18 and the size of the memory 20 is selected to achieve the desired delay. While the quantity of registers is reduced, the amount of the delay is fixed since a variable delay is not possible in the scheme shown using a single register 18. Counters having a maximum count equal to an integral power of 2 require no minimum count detection for resetting the counter. Therefore, a memory size $2^k$ is preferred. Such an arrangement is shown in FIG. 3 as a delay stage (DS)22.

The delay stage also includes a single bit of a shift register (SR) 24, a one bit control register (S) 26 and a two way multiplexer 28.

The input pixel stream (PIXI) is provided to both shift register 24 and memory 20. The output of the shift register is provided to one input of the multiplexer 28. The pixel read out of the memory 20 is provided to the other input of the multiplexer 28. Under the control of a signal from the control register (S(i,j)) 26, the output of the multiplexer 28 (PIXO) is the input pixel stream (PIXI) delayed by either a fixed delay of one pixel time provided by shift register 24 or a fixed delay of $1+2^k$ pixel times as provided by the memory 20. The delay stage 22 may be thought of as having a variable programmable delay of 0 or $2^k$ pixel times. It will become apparent below that the fixed "1" pixel time delay can be made to have no affect in the overall processor timing synchronization.

Any positive integer I may be generated as a selected sum of integers having values $2^k$ (k being a positive integer). Positive integers I(i) can be generated at the same time according to the following equation:

$$I(i) = (S(i,0) \times 2^k) + (S(i,1) \times 2^{k-1}) + \ldots + (S(i,k) \times 2^0)$$

or $$I(i) = \sum_{j=0}^{j=k} S(i,j) \, 2^{k-j}$$

Figure 4:
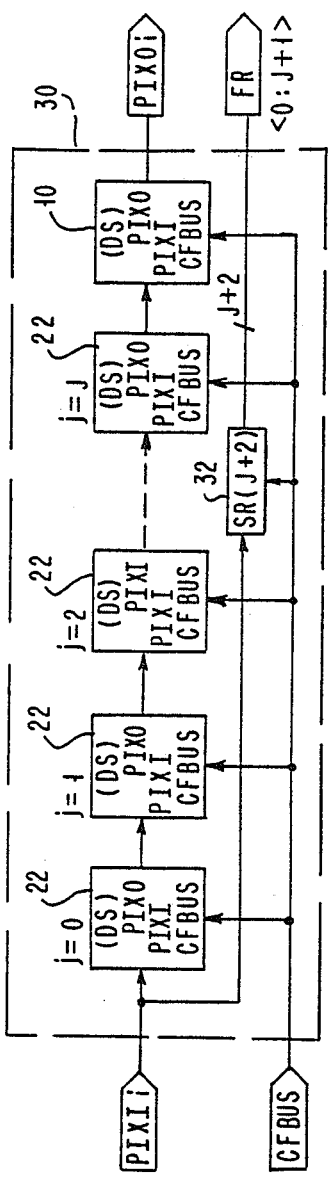
FIG. 4 is a schematic representation of a delay chain circuit.

It will be apparent that by combining K+1 delay stages 22 in series as shown in FIG. 4, the first delay stage DS(0) having a memory size $2^k$ and each succeeding delay stage having one-half the memory size of the immediately preceding delay stage, a variable delay of any amount up to $2^{k+1}-1$ cycles can be achieved. For any delay I(i) control register 26 (S(i,j)) selects the appropriate path in delay stage in the Jth stage DS(j) 22. In each delay stage 22, there are two paths. One path has a delay of 1 cycle through shift register 24 if S(i,j) is a zero. The other path has a delay of $1+2^{k-k}$ if S(i,j) is a one. Therefore, a programmable delay I(i) of a delay chain (DC) is equivalent to the value of the binary number in the S(i,j) bits from control register 26 controlling the delay.

FIG. 4 is a schematic representation of a delay chain of the type described above modified in order to reduce the quantity of delay stages.

The modification entails replacing several of the delay stages 22 having the smallest memory with a single programmable delay 10. The delay chain 30 comprises a series connection of delay stages 22, DS(0)

through DS(J). Each delay stage DS(j) where j=0,1,2, ...J, has a memory size equal to $2^{J+L}-j$ where J,L and j are integers.

The output of the Jth delay stage DS(J) is connected to a programmable delay 10. The input image stream PIXI(i) to the delay chain 30 is connected to the input of the delay stage DS(0) having the largest memory and the output stream PIXO(i) is the output from the programmable delay 10.

Also connected to the input PIXI(i) is a shift register 32 having a preset delay relative to the input PIXI(i) of J+2, which delay is equal to the fixed minimal delay of the delay chain 30. Therefore, the output PIXO(i) from programmable delay 10 has a delay equal to J+2+I(i) cycles and the output FR from shift register 32 has a delay equal to J+2 cycles. Again, the delay chain may be thought of as providing a variable delay of zero or I(i).

The delay of the programmable delay 10 is variable from 1 to $1+2^L$ in order to replace the L smallest memory size stages with a single memory and to limit the overall delay of the L stages to one cycle.

It should be apparent to those skilled in the art that simplification of the delay chain 30 embodiment is possible. First, the read write addresses 18 of each delay stage 22 of the delay chain 30 are related to each other as binary counters of different maximum counts, regardless of the initial address of the address 18. All the read write addresses 18 in the delay chain 30 may be replaced by a single address 18. Each delay stage 22 is controlled by a single output bit of the appropriate power of 2 from the address. In this manner, the composite I(i) is formed as described above. The address 18 is initialized by means of a signal along CFBUS. That is, all K+1 bits of the address 18 are connected to the memory 20 of the zeroth delay stage, the lower order K bits are connected to the memory 20 of the first delay stage and so forth with the lowest order K+1−j bits of the address 18 being connected to the memory 20 of the Jth delay stage. The write address 12 in the programmable delay 10 can be arbitrarily set to zero which can be implemented by some low order bits from read write address 18. Thus, in addition to the read address counter 14 in programmable delay 10 only one counter 18 is required for each delay chain 30 regardless of the quantity of delay stages comprising the delay chain.

Having described an arrangement for providing variable delay functions for an input image pixel stream, a preferred embodiment for extracting a generalized neighborhood window will now be described. Basically each of the neighborhood window pixels can be defined in terms of the pixel location relative to its closest previously scanned neighbor pixel. For example, referring to pattern PT1 in FIG. 1D, starting with the upper left hand corner and scanning left to right and top to bottom, the second neighbor is exactly one image width plus seven pels distant from the first neighbor pel in the first column of the first row of the image. Likewise, the third neighbor is two positions less than two full image width distant from the second neighbor and so on for each of the fourth through ninth neighbors.

So long as the separation distance between each neighbor pair is greater than the fixed delay of each delay chain 30, a simple arrangement of delay chains can be configured to provide the delay between the ith neighbor and the i+12th neighbor in the window. A general neighborhood circuit 34 in FIG. 5 comprising N−1 delay chains 30 is used to provide delays between the N pels comprising the neighborhood window.

Figure 5:
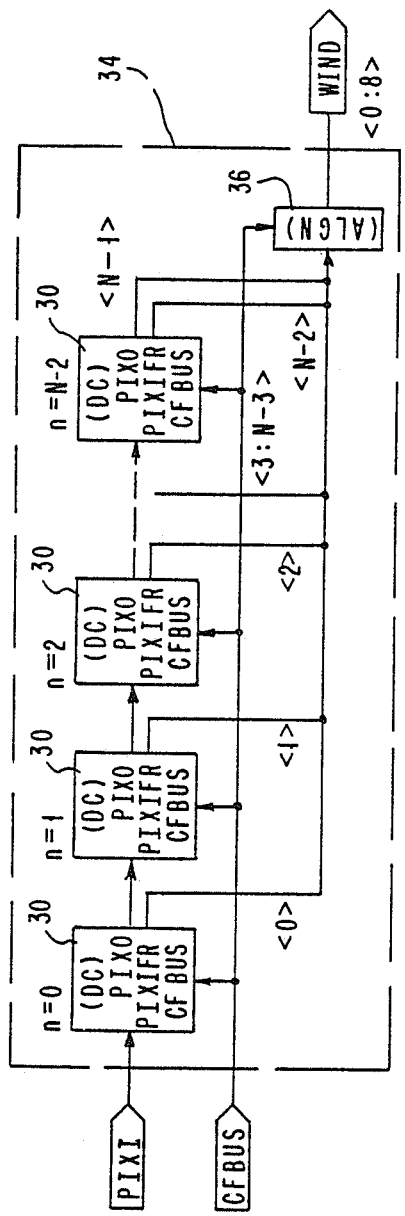
FIG. 5 is a schematic representation of a general neighborhood circuit.

In FIG. 5 there is shown a general neighborhood circuit 34 comprising N−1 serially connected delay chain circuits 30. The fixed minimal delay between inputs to two successive delay chains at output FR is equal to J+2 pels. The circuit in box 36 labeled ALGN receives (J+2)×(N−1)+1 pels, J+2 from each of the N−1 delay chains FR outputs and one from the PIXO output of delay chain DC(N−2), and aligns the outputs as required if offsets less than the constant J+2 cycle delay of any delay chain 30 is required. The output of the ALGN circuit, WIND, is the general neighborhood function desired. The example described has been simplified in order to illustrate one possible manner in which a plurality of delay chain circuits may be combined into a single neighborhood circuit. In the description that follows, it will be shown how a more general window selection function can serve multiple general neighborhood circuits.

Just as the read write address 18 in the delay stages 22 of the delay chain circuit 30 could be reduced to a single address 18, the addresses 18 of each delay chain circuit 30 of the general neighborhood circuit 34 is replaceable by a single read write address 18. The use of single address 18 is possible since the programming of the delay is accomplished by the control register 26 control variable S(i,j).

Since there are multiple general neighborhood circuits 34, a further simplification is possible by changing the configuration of the memory comprising the circuit 34. The zeroth delay stages DS(0) in each delay chain DC(i), where i is a set of integers, have the same size memory. Similarly, the first delay stages DS(1) in each delay chain DC(i) have the same size memory and so forth for each of the sets of delay stages DS(j). The size of memory in a particular delay stage is related to the total delay of the chain and in which stage in the chain the memory is located. Hence, if there are N general neighborhood circuits 34, the N single bit memories in the N delay stages DS(0) can be combined into one memory with N bits per word and common addressing logic. The same holds true for combining the memories of delay stages DS(1) through DS(j).

Figure 6:
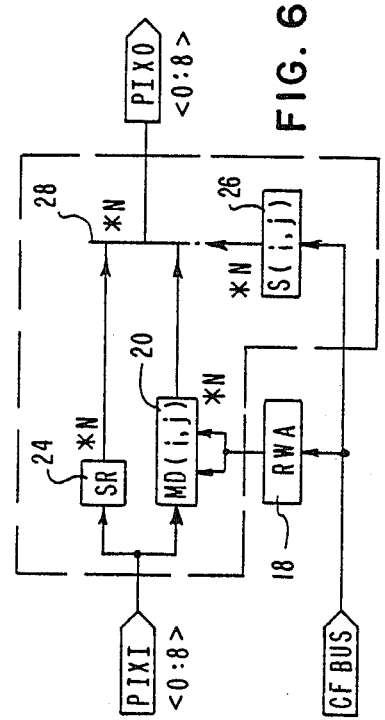
FIG. 6 is a schematic representation of a plurality of delay stage circuits from the same position within the delay chains used in a plurality of general neighborhood circuits.

FIGS. 6 illustrates an arrangement of N delay stages 22 comprising the jth delay stage in each of the ith delay chains 30 of N general neighborhood circuits 34. The single memory is controllable by a single read-write address 18.

In FIG. 6 and certain later figures, the symbol *A means that the element shown is repeated A times in the embodiment, but is shown once for illustrative purposes and to avoid unduly complicating the figure.

It is essential to the understanding of the invention that the control registers 26 determines system delay configuration and the values are established in the control registers during system initialization. Other control registers used elsewhere similar to those described in MITE are also initialized.

The use of immediately adjacent neighbors is found in most common windows including the conventional three by three square array window. This simple neighborhood could not be realized in the previously discussed general neighborhood circuit of FIG. 5. This is due to the fact that shift registers 24 in delay stages 22 of the delay chains 30 introduce fixed delays of J+2 between the delay chains of the general neighborhood circuit 34. However, one solution to this problem is to make all the elements of second shift register SR(J+2) 32 available to a more general selection circuit than the ALGN circuit 36. Such a circuit will hereafter be referred to as a window selection circuit. The window selection circuit will be described below after it is described how multiple general neighborhood circuits are combined into groups in the next higher level of the system.

Figure 7A:
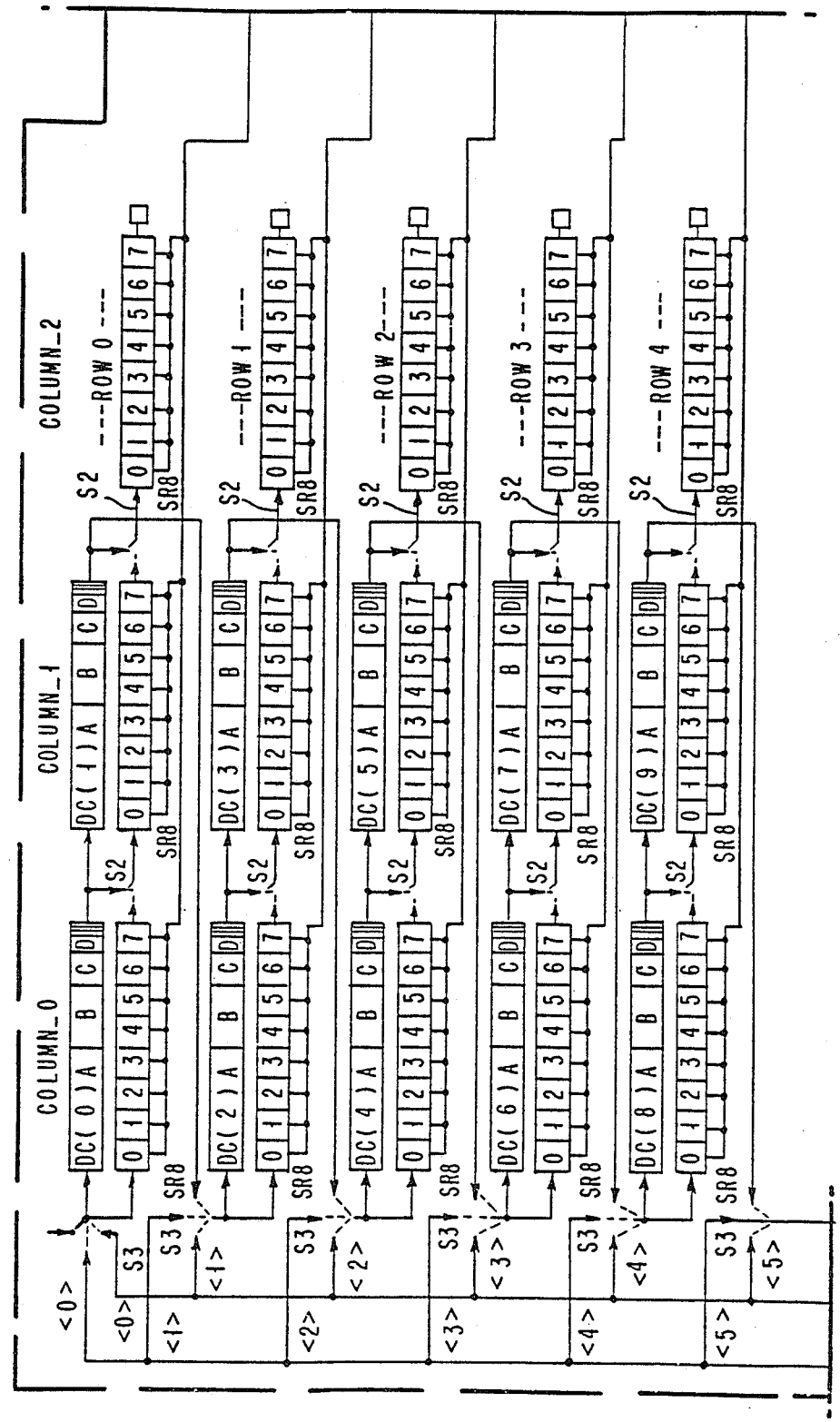

FIG. 7 is a processing element group (PEG) 35 comprising a multiple quantity of general neighborhood circuits 34 with window selection circuit 38, neighborhood function look-up tables 40, processing element size selection circuit 90, boolean combiner 48, input selection logic 49, and bus distribution logic 51. The same general elements are found in the MITE system. The shift register 32 in the delay chain 30 is relabelled as SR8 and has been separated from its associated delay chain labeled DC(i). An additional shift register SR8 is added in column 2 for each pair of delay chains. The shift registers and delay chains are arranged in three columns and nine rows in order to facilitate understanding of the process. There are also path selection switches S2,S3 which are absent from the previous FIGS. 2 through 6. The manner by which the shift registers SR8 allow processing of very near neighbor pixels in a neighborhood window will be described hereinafter. The output signals from all positions of each shift register SR8 are fed to a window selection circuit 38 which replaces the plurality of ALGN 36 circuits in FIG. 5. The output signals from the window selection circuit 38 are used as addresses for logic lookup tables (LUT) 40. The operation of the window selection circuit 38 will be described in detail in conjunction with FIG. 9.

FIG. 8 shows a portion of the general neighborhood circuit in FIG. 7 with switches S2 and S3 in predetermined positions as will be explained hereinafter. Also, certain locations in selected shift registers SR8s have been shown as shaded to indicate the locations of pixels in one of several neighborhood windows shown and described below.

Referring to DC(8) and DC(9), in row 4, columns 0 and 1 respectively, and the associated switches S2 and S3 in row 4, the input image stream labelled PEPE <4> is provided via switch S3 to both delay chain DC(8) and shift register SR8 in row 4, column 0. The output of delay chain DC(8) is provided via switch S2 to both shift register SR8 in row 4, column 1 and to delay chain DC(9). The output of delay chain DC(9) is provided via switch S2 to shift register SR8 in row 4, column 2. When the delay, including the fixed delay, of delay chain DC(8) and delay chain DC(9) are each set to one image width, then the first three positions from each of the three shift registers SR8 in row 4 will contain exactly the conventional three by three square array neighborhood window. That is, the pattern PT1 in FIG. 1A is shown as it would appear in row 4 of the general neighborhood circuit in FIG. 8.

All eight outputs from each of the three shift registers SR8 in each of the nine rows are provided as inputs to window selection circuit 38 as shown in FIG. 7. The window selection circuit 38 provides exactly the nine neighbor pels described to one of the logic lookup tables 40 as will be described in conjunction with FIG. 9.

As another example, suppose the neighborhood window is to comprise nine vertically adjacent neighbors as shown as pattern PT4 in FIG. 1E.

The selection of the window depends upon the size of the image width relative to the maximum delay in one delay chain DC. First, assume the image is wider than eight pels but is sufficiently small to be accommodated in one delay chain. The proper neighborhood window is shown in rows 0 to 3 in FIG. 8.

The input image stream labelled PEPE <0> is provided via switch S3 to the input of both the delay chain DC(0) and the shift register SR8 of row 0 column 0 (the first neighbor position). After a delay of one full image width by delay chain DC(0), the output from delay chain DC(0) is provided via switch S2 to the input of both the delay chain DC(1) and shift register SR8 of row 0 column 1 (the second neighbor position). After another delay of one full image width by delay chain DC(1), the output from delay chain DC(1) is fed via switches S2 and S3 to the input of delay chain DC(2) and shift register SR8 of row 1 column 0 (the third neighbor position). The same sequence continues until the signal is finally provided to shift register SR8 of column 3 row 3 (the ninth neighbor position). Thus, by setting the delays of delay chain DC(0) through delay chain DC(7) to be equal to the image width, the nine vertical neighbors of the neighborhood window will be located as shown as shaded and described above.

It will be apparent to those skilled in the art that the nine neighbors shown in the shift registers SR8 in rows 0 to 3 of FIG. 8A could be any generalized nine neighbors with separations equal to the separation delays provided by the delay chain. Each delay chain DC(i) delay is determined by its respective control register S(i,j). The total delay is eight cycles more than the programmable amount, therefore, control register S(i,j) must be eight less than the actual displacement. If two neighbors, such as pair 5 and 6 of pattern PT1 of FIG. 1D, are closer than the eight pels minimum delay of any delay chain, then the total delay in delay chain DC(5) and delay chain DC(6) when added together will have to be equal to the distance from neighbor 5 to neighbor 7, which in the present example will be located in the first position of the shift register SR8 in row 4 column 1. In the present example, neighbor 5 and neighbor 6 will be found in the same SR8.

Figure 8B:
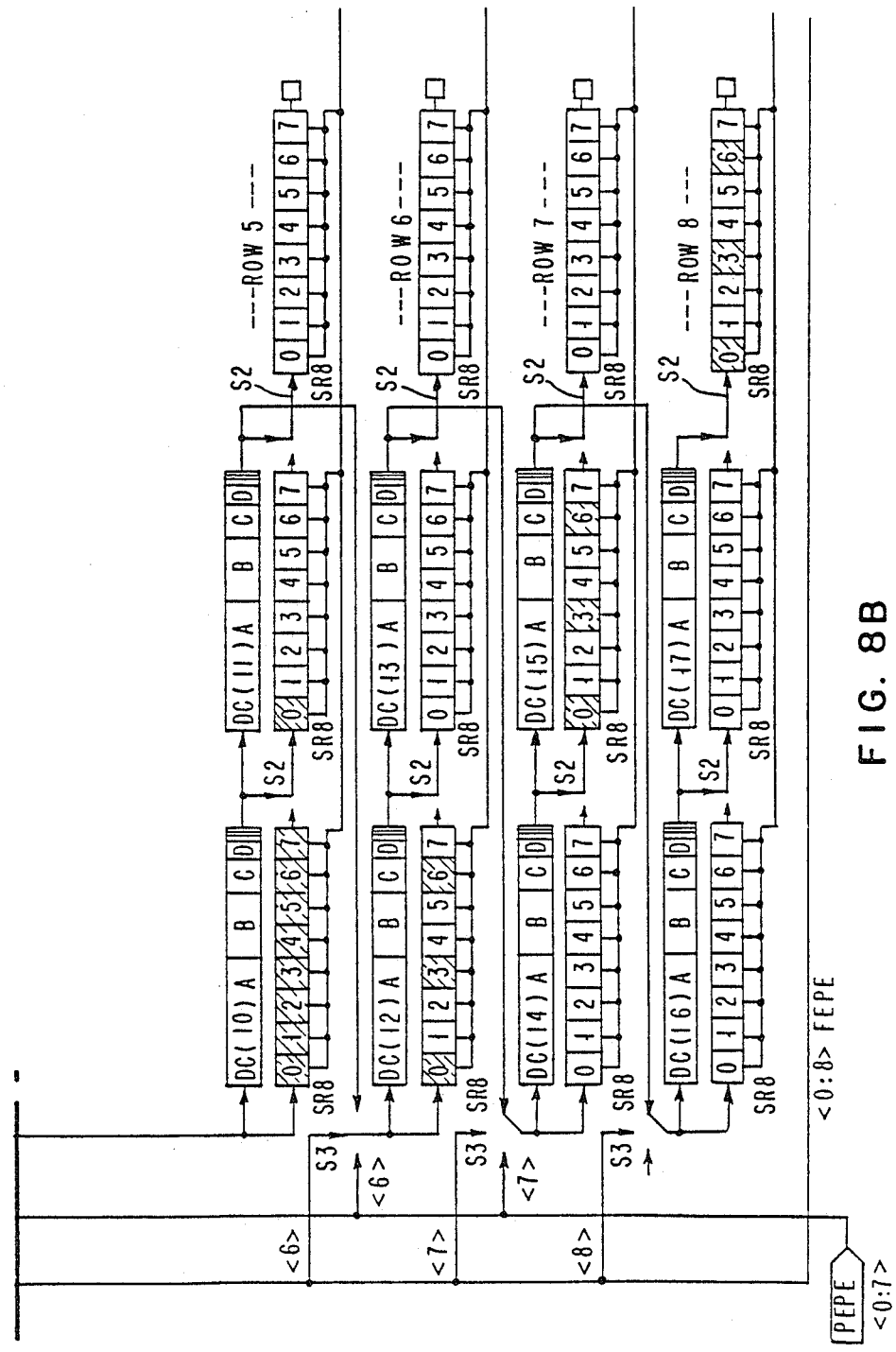

In the case when the image width or the image exceeds the maximum delay obtainable in a single delay chain, multiple delay chains are combined to equal the image width delay required. Rows 6 through 8 in FIG. 8B illustrates the case where the total delay through delay chain DC(12), delay chain DC(13) and delay chain DC(14) exceeds the image width. A similar delay is obtained through delay chain DC(15), delay chain DC(16) and delay chain DC(17). The use of these delay chains in series can provide the delay of three rows in an image which is narrower than one DC as in the pattern PT1 in FIG. 1C, or alternatively provides the delay when the image is wider than the delay of one delay chain as in the pattern PT1 of FIG. 1E. Either pattern PT1 of FIG. 1E or pattern PT1 of FIG. 1C will occur in the shaded bits of the SR8s in row 6, column 0; row 7, column 1; and row 8, column 2 depending upon the amount of delay in the delay chains DC relative to the image width.

The adjustment of the delays in the delay chain stages serves two functions. First, it adjusts the processor for the variable image widths found with different input devices. Second, it provides variable offset between neighboring pels. Since offset is a function of image width, both adjustments are achieved simultaneously.

When the window is smaller than the image width there is a portion of the memory which is not being utilized. In a system in which an ultimate goal is to use VLSI chips, maximum utilization of available memory is desirable. The problem arises because the memory is in hardware but the hardware is not required for a particular application or window configuration.

The problem is overcome when the general neighborhood circuits in the processing elements are capable of being configured and reconfigured so that different combinations of delay hardware found in different neighborhood circuits can be gated together to achieve the desired delay. That is, a variable quantity of neighbor windows are capable of being generated using a fixed amount of delay chains by selectively routing the image streams from delay chain to delay chain in different general neighborhood circuits. For example, if the image width is less than the maximum delay in a delay chain, then the 18 delay chains in FIG. 7 can handle nine simple three by three neighborhoods. Alternatively, a neighborhood such as that shown in rows 0 to 3 of FIG. 8, can only fit twice into the 18 delay chains shown, in rows 0 to 3 and in row 4 to 7. Again, if the image width is eight times the size of the maximum DC delay, a simple three by three array would require 16 delay chains and the pels forming the window would be in positions 0,1 and 2 of the shift register SR8 in row 0 column 0, row 4 column 0, and row 8 column 0 (or row 7, column 2).

The general neighborhood circuit in FIG. 7 can be used as one full neighborhood to comprise one processing element. The circuit can be divided in half (rows 0 to 3 and row 4 to 7) to form two processing elements. Each half can be split in half (rows 0 to 1 and rows 2 to 3) so that either three or four processing element can be configured. Another split would result in each row providing one processing element thereby allowing from five to eight processing elements to be implemented. Processing elements can utilize any quantity of rows, such as the example shown in rows 6 to 8. In that case, three processing elements may be formed. All of the above cases assume that the start of the delay (and the first neighbor in a window) begins in a delay chain DC and shift register SR8 that starts a row.

The capability of gating pertinent bits of a general neighborhood circuit permits a fixed amount of memory to be used for generation of a variable quantity of neighborhood windows. The ability to reconfigure the circuit results in further use of a limited amount of memory.

Figure 9A:
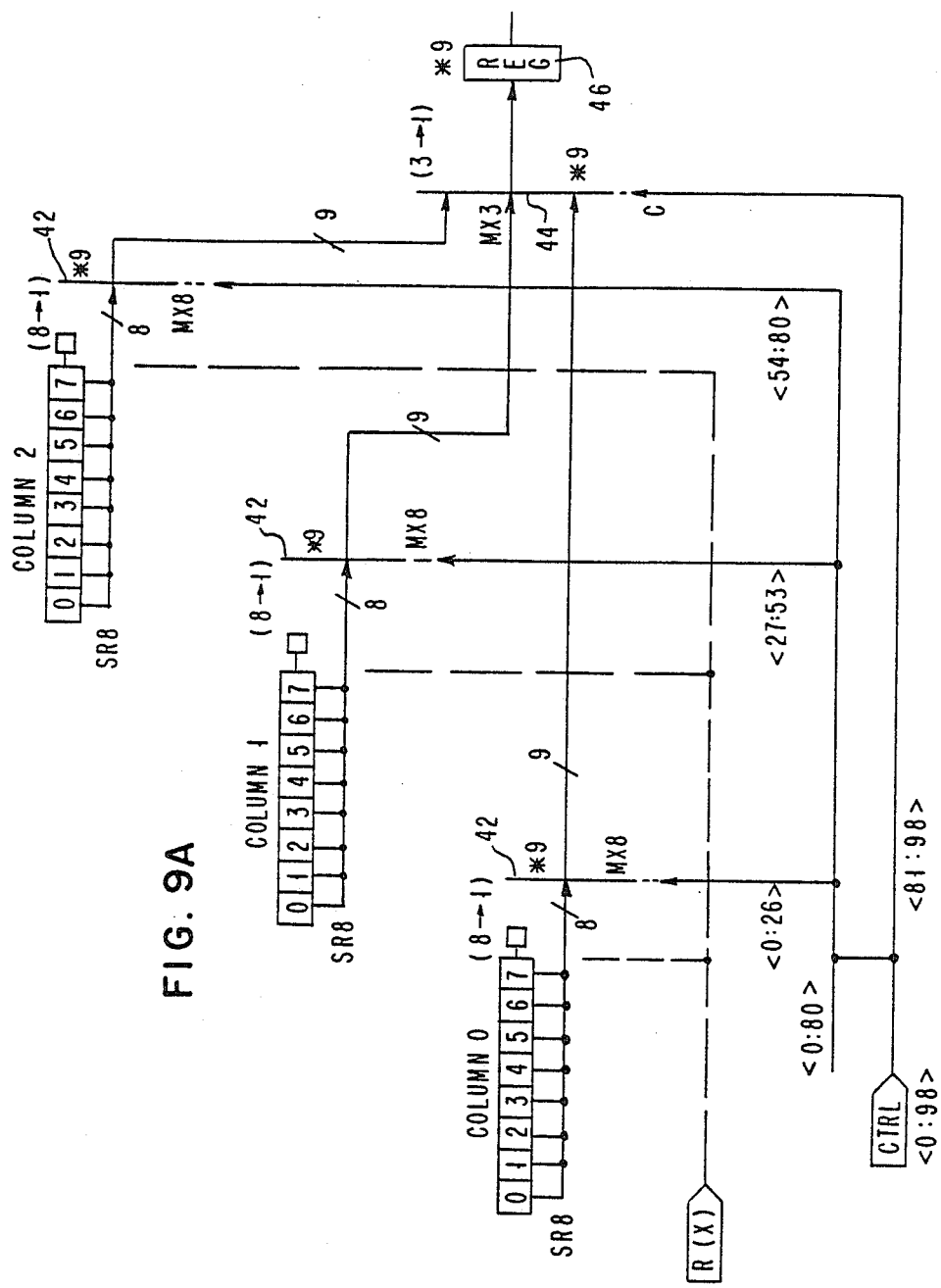
Figure 10A:
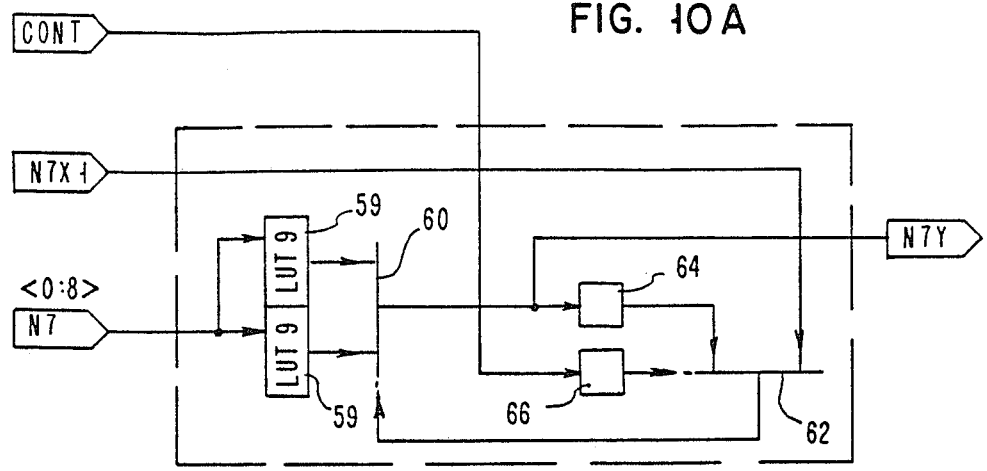
FIG. 10A is a schematic representation of a building block used repetitively in the circuit per FIG. 10.

The window selection circuit 38, shown in detail in FIGS. 9A and 9B, is programmed for selecting which pels in the shift registers SR8 processing element group 35 form the actual neighborhood windows. In FIG. 8 all eight inputs from each of the three shift registers SR8 in each of the nine rows are provided as inputs to the window selection circuit 38. The window selection circuit is configured for providing the window selection information to the neighborhood lookup tables 40 in a cost effective manner.

The window selection circuit 38 provides signal switching at what may be thought of as two levels of switching. The first level switching for a single row is shown in FIG. 9A. There are nine similar structures, one for each row. Each shift register SR8 is connected to nine, eight to one multiplexers (MX8) 42. The multiplexers 42 reorder and copy the shift register SR8 values. The nine values from each of the three shift registers SR8 in a single row are fed to nine, three to one multiplexers (MX3) 44. Each multiplexer MX3(i) of a single row selects a single value from the ith bit of the outputs from each of the three multiplexers (MX8) associated with that row. The result is the three bits from multiplexer 44 to REG 46 can be any nine bits (including duplication) from the 24 bits of the three SR8s of a given row.

Nine positions are required, instead of eight, since the neighborhood window is to consist of nine pels in the present example. The nine bits selected are the selected neighborhood bits for the given row. Register REG 46 is included to prevent excessive logic delays from accumulating in the switching path. The addition of the register REG 46 is an implementation detail and is not essential to a proper understanding of this invention. The additional "shift delay" can be added without any adverse effect upon the window selection circuit, however the shift delay must be taken into account in computing the total calculation time for a processing element on a given image.

The first level switching on a row basis provides that any one of the 24 shift register SR8 positions in a row can be gated to any of the nine positions on the register REG 46 for the given row, including any duplications.

The nine, nine bit row selections in the nine REGs 46 are further selected through a second level switching arrangement shown in FIG. 9B. Selection circuit 45 receives the output from one or more row registers REG 46, and provides nine bits of output. The selection circuit is a N to 1 multiplexer, where N is equal to the quantity of registers REG 46 connected to the respective selection circuit 45. The use of a bit by bit selection permits values from different row windows to be selected. It should now be obvious that the reordering of the row bits in the first level switching permits different row window bits to be used with the same LUT 40 without interfering with each other. All row windows need not be connected to each window selection circuit 45. Table 1 shows one possible connection relationship between the register REG 46 and the window selection circuit outputs N0 to N7 which are subsequently fed to LUTs 40 and size selection circuit 90.

TABLE 1

| REG(n) to SEL(i) Connection | |
|---|---|
| SEL(i) | Inputs from REG(i) |
| 0 | 0,1,2,3,4,5,6,7,8 |
| 1 | 1 |
| 2 | 2,3 |
| 3 | 3,4,5 |
| 4 | 4,5,6,7,8 |
| 5 | 5 |
| 6 | 6,7,8 |
| 7 | 7 |

The connections show that neighborhood windows spanning a larger number of rows do not have to start at any arbitrary row position.

The gating possibilities are arranged for simplifying window selection. For example, if eight windows each spanning one row is desired, each SEL(i) multiplexer in FIG. 9B controlled from a control register (not shown) selects the corresponding REG(i) inputs. For another example, if four neighborhood windows of two rows each is desired, multiplexer SEL(0) selects inputs from register REG(0) and register REG(1), multiplexer SEL(2) selects inputs from register REG(2) and register REG(3), multiplexer SEL(4) selects inputs from register REG(4) and register REG(5) and multiplexer SEL(6) selects inputs from register REG(6) and register REG(7). Simila configurations are possible such as three windows of three rows each, two window of four rows each or one window spanning from five to nine rows.

Figure 13:
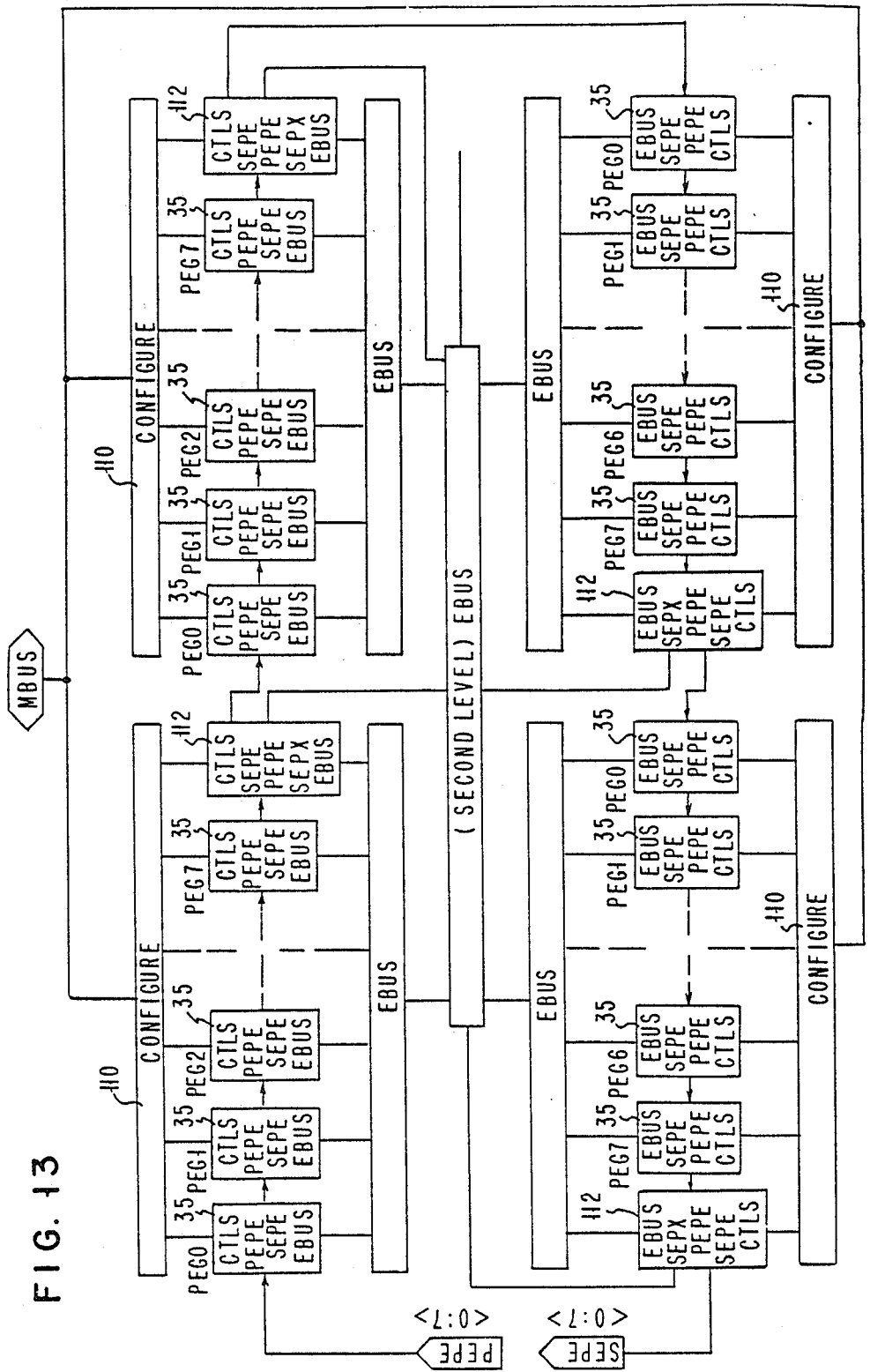
FIG. 13 is a schematic representation of the system level of the invention.

In the situation where the image widths exceeds the available memory size, it is possible that the window selection function will require more delay than is available from even nine rows of memory. One solution is to couple together two groups of hardware of the type shown in FIG. 7. The groups are connected via a system bus and the image stream is gated to a second group of eight window functions. The transfer is effected by the enumerator bus (EBUS) (FIG. 13). In FIG. 7 input selection logic 49 receives the size selection circuit 90 outputs from the enumerator bus and bus distribution logic 51 gates size selection circuit 90 outputs to selected lines of the enumerator bus. The use of a boolean combiner 48 capable of receiving signals from the PE size selection circuit 90 and from the system bus and the method of transmitting size selection circuit 90 output signals to other processing elements via the bus allows for complete configurability of the processing elements as is known, for instance, in the MITE system.

In order to maximize memory utilization and to increase system flexibility, a quantity of distinct small memories can appear as if it were one large memory, if all the memories have identical address values at all times. When the eight neighborhood function RAMs or eight look up tables LUT 40 are receiving different neighborhood windows, the memories act independently. Alternatively, if the nine neighborhood window bits are gated to all eight RAMs, at the same time, then the eight memories will function as eight portions of a large memory.

A preferred embodiment of processing element size selection circuit 90 is shown in FIG. 10. Two memories with independent addressing capability or with their addresses constrained to be the same can be used. When accessed, each memory will provide as an output the contents at the selected address. An additional address bit will select which of the two outputs is further selected. FIG. 10A shows this principle in operation demonstrating a building block used repetitively in the circuit per FIG. 10. Two single bit memories LUT 59 of $2^9$ bits receive the same nine bit address N7 from an associated window selection circuit lookup table at their inputs. The two outputs, one from each LUT 59, are provided as inputs to multiplexer 60. The multiplexer 60 is controlled by a control bit or a tenth bit of the address to produce the output on conductor N7Y. In the MITE system, the tenth bit can be a feedback bit from a prior neighborhood function pixel. Another multiplexer 62 controlled by controller 66 selects whether the feedback bit from feedback register 64 or another input N7X1 from the window selection circuit 38 is used as the tenth bit. In the same way, the output of two such ten bit assemblies can be selected by an eleventh bit and so on. In FIG. 10 such an arrangement is shown with controller 68 selecting either the feedback bit from feedback register 70 or the eleventh neighbor pixel N0X2 via multiplexer 72.

The inputs to multiplexer 72 via register 70 are the outputs of the two previous ten bit stages as selected by multiplexer 78 from multiplexers 74 and 76.

It will be apparent to those skilled in the art that the described method can be extended to any size memory.

The selection chain in FIG. 10 may be used as a simple $2^{13}$ bit memory (with the 13th bit being either a neighbor or feedback bit) or as two $2^{12}$ bit memories. Similarly each $2^{12}$ bit memory can be used as two $2^{11}$ bit memories and so on. The control bit is either a previous output or an independent input. Also, a plurality of output multiplexers 75,77,79,81 is used to determine which data is provided as the size selection circuit output NF.

The important aspect in causing the memories to accommodate different size neighborhoods is the capability to switch different or identical neighborhood windows to different LUT 59 memory addresses. The switching capability is possible using the window selection circuit in FIG. 9 with modification to Table 1 supra.

For example, in order to compute one 13 bit neighborhood spanning the full group of nine rows of delay chains in FIG. 7, all eight neighborhood windows require nine identical bits. Therefore, the multiplexer of FIG. 9B requires access to the complete set of row registers. Hence, the full selection capability of Table 2 is required. Also, the first level switching in FIG. 9A must be expanded from nine to thirteen bits in order to provide the additional four neighbor bits for the neighborhood size selection circuit in FIG. 10.

It will be apparent that the control bits which configure the hardware for any given processing task may be loaded from a host computer during reconfiguration or setup time, the same as with all of the other control registers in the embodiments shown and described.

TABLE 2

| Reg(n) to N(n) Connections | |
|---|---|
| N(n) | Input from Reg(n) |
| 0 | 0,1,2,3,4,5,6,7,8 |
| 1 | 0,1,2,3,4,5,6,7,8 |
| 2 | 0,1,2,3,4,5,6,7,8 |
| 3 | 0,1,2,3,4,5,6,7,8 |
| 4 | 0,1,2,3,4,5,6,7,8 |
| 5 | 0,1,2,3,4,5,6,7,8 |
| 6 | 0,1,2,3,4,5,6,7,8 |
| 7 | 0,1,2,3,4,5,6,7,8 |

If in a given window, a particular delay stage 22 (FIG. 3) counter register 26 is set so that the input signal PIXI undergoes a fixed delay via the shift register 24, the associated memory 20 is unused. It is possible, however, to use this memory so as to flexibly expand the system capabilities without additional memory.

Figure 11A:
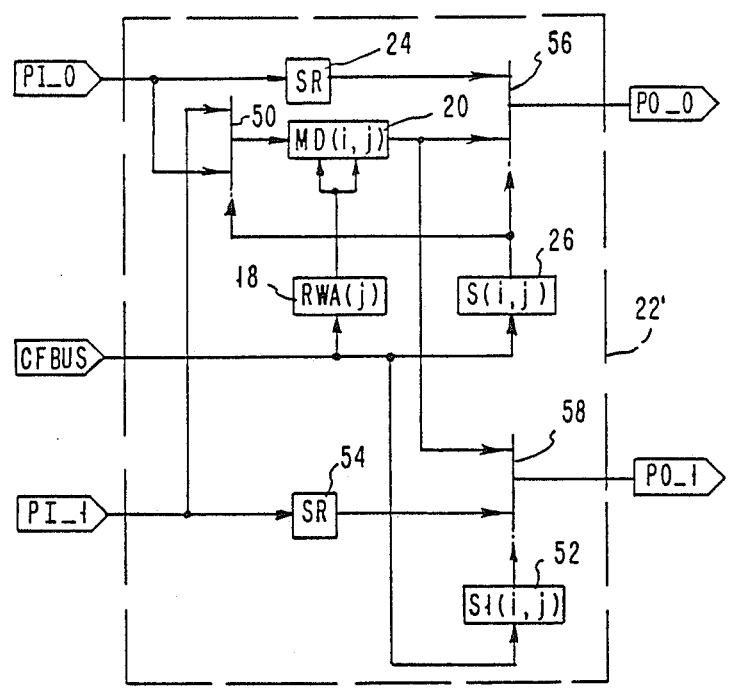
FIGS. 11A, 11B and 11C are schematic representations of alternative embodiments of a delay stage circuit, delay chain circuit and a general neighborhood circuit, respectively.
Figure 10B:
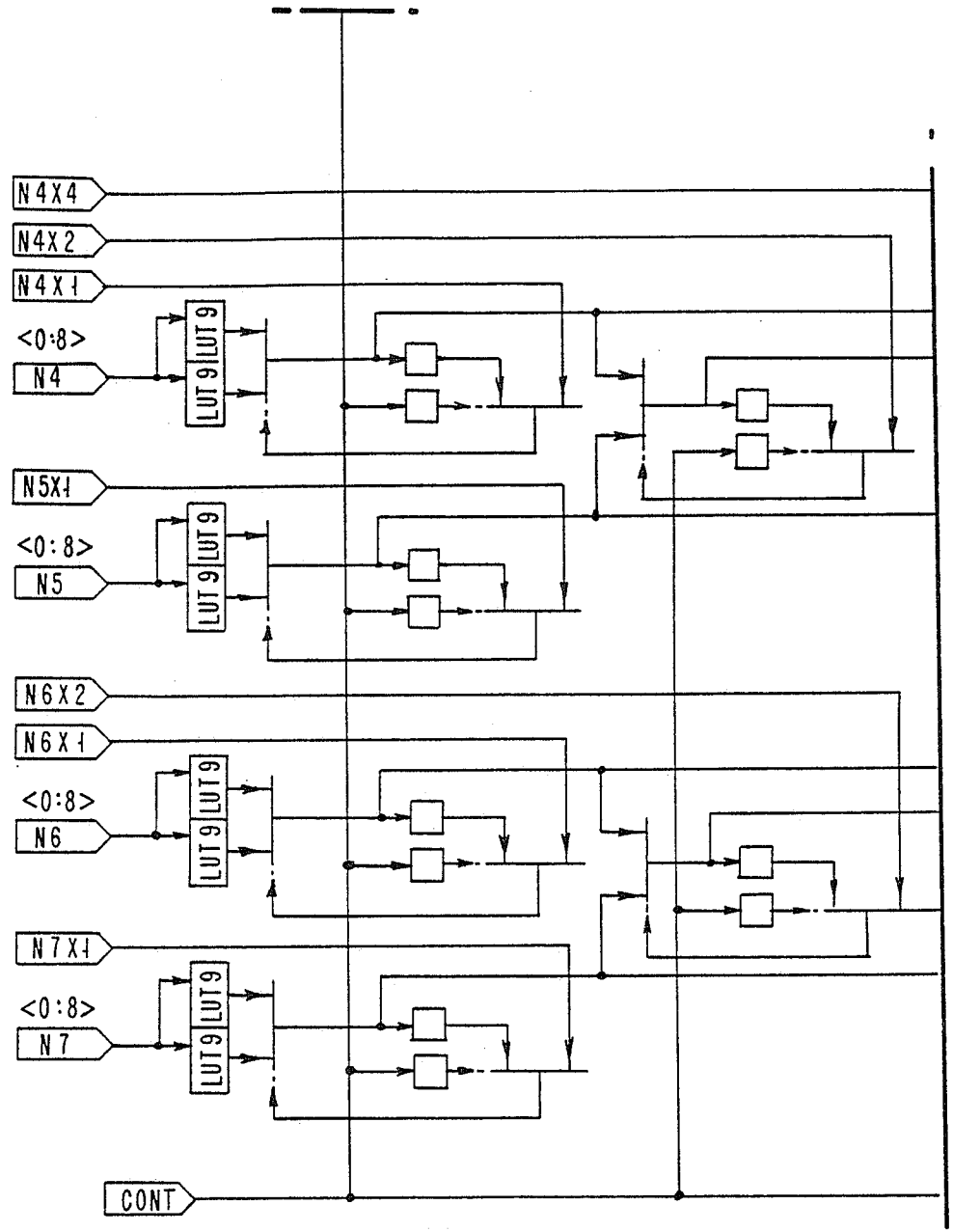
FIGS. 10B, 10C, 10D and 10E are combined to provide a schematic representation of a processing element size selection circuit.
Figure 10C:
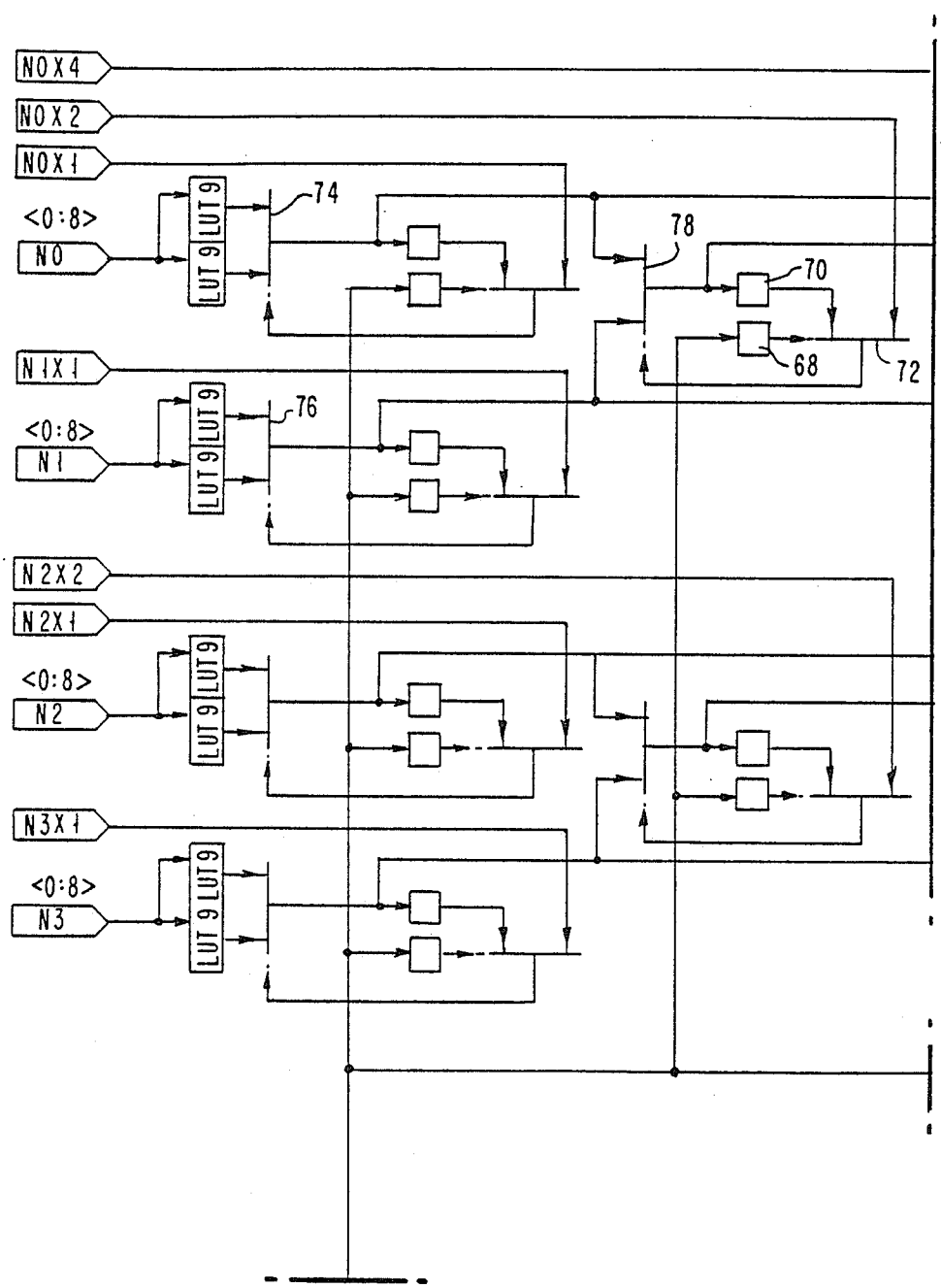
Figure 10D:
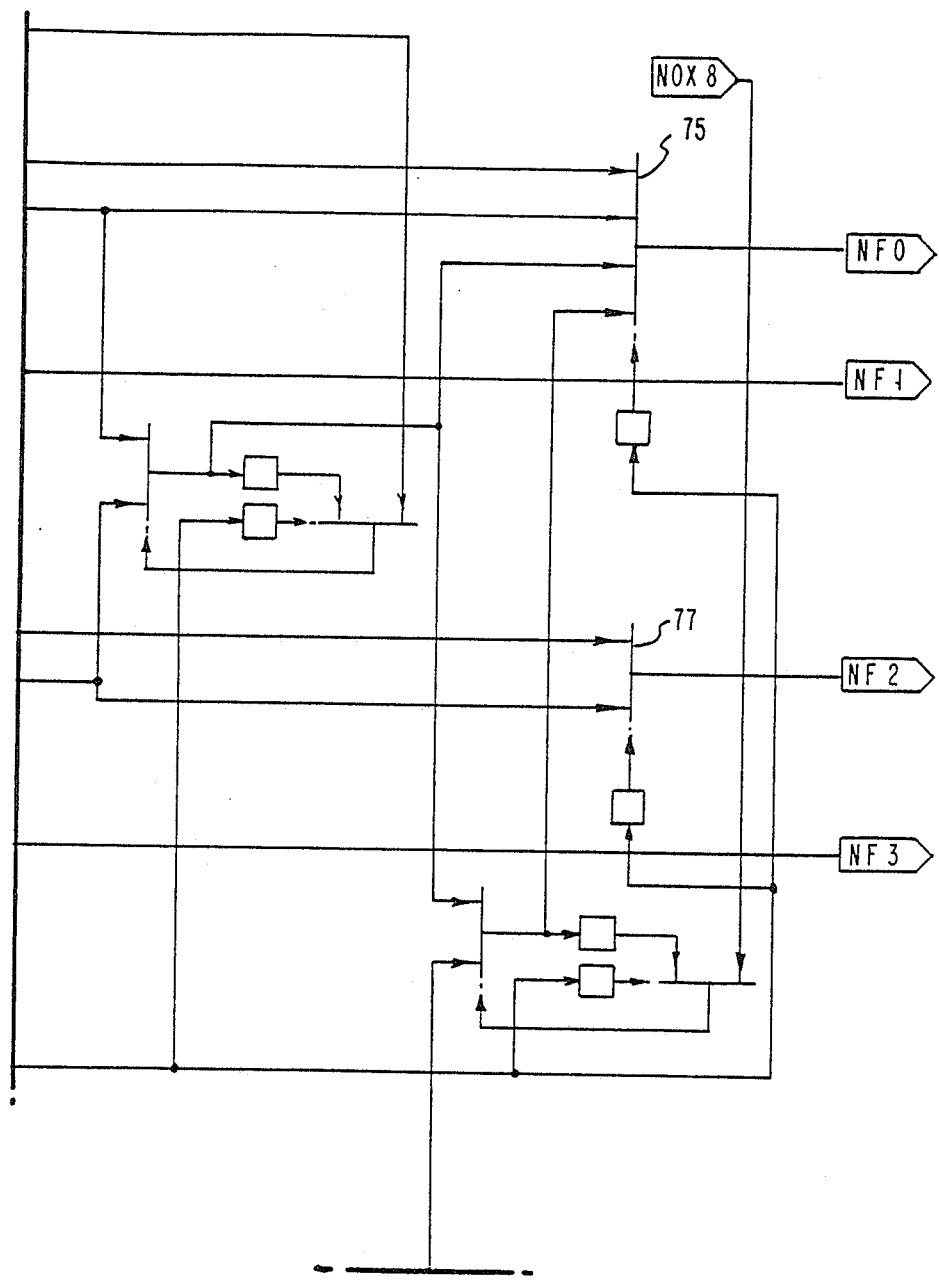
Figure 10E:
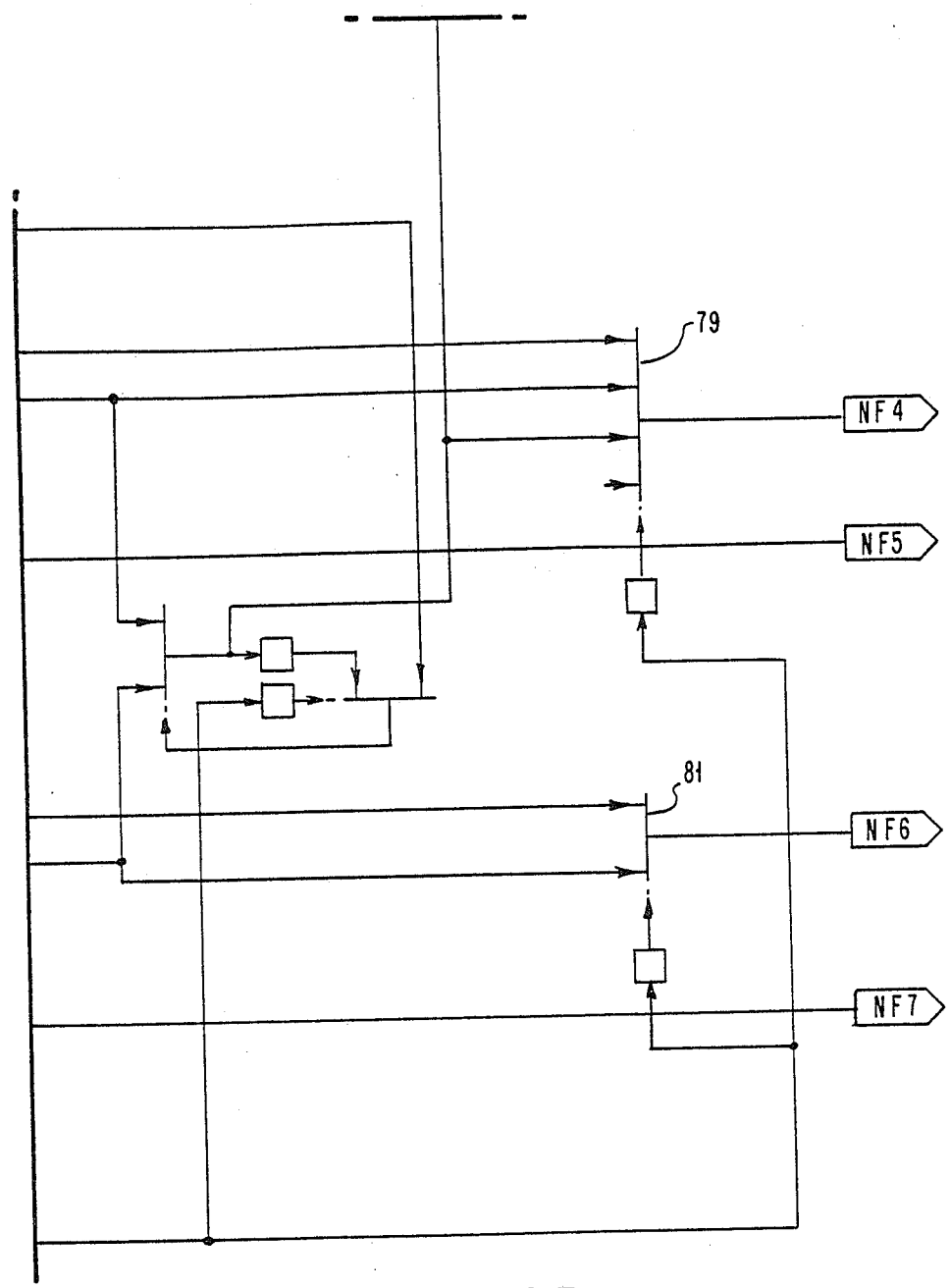

Referring to FIG. 11A, there is shown two input image streams, PI_0 and PI_1. Both signals are provided as inputs to a two way selector 50 which is controlled by the control register 26. The control is such that if the input PI_0 through shift register 24 is coupled by multiplexer 56 to output PO_0, then the other input PI_1 is connected to the memory 20. The converse also holds true. Using a second control register 52, results in the output PO_1 being selected at selector 58 from either memory 20 or from shift register 54. It is also possible for control register 26 to control selector 58 as well selector 50 and selector 56. The outputs PO_0 and PO_1 are always delayed in the opposite sense, one is delayed by an amount fixed through a shift register and the other is delayed by an amount determined by the memory. Thus, if no variable delay is desired between PI_0 and PO_0, then the memory delay is available for use between PI_1 and PO_1 instead.

Figure 11B:
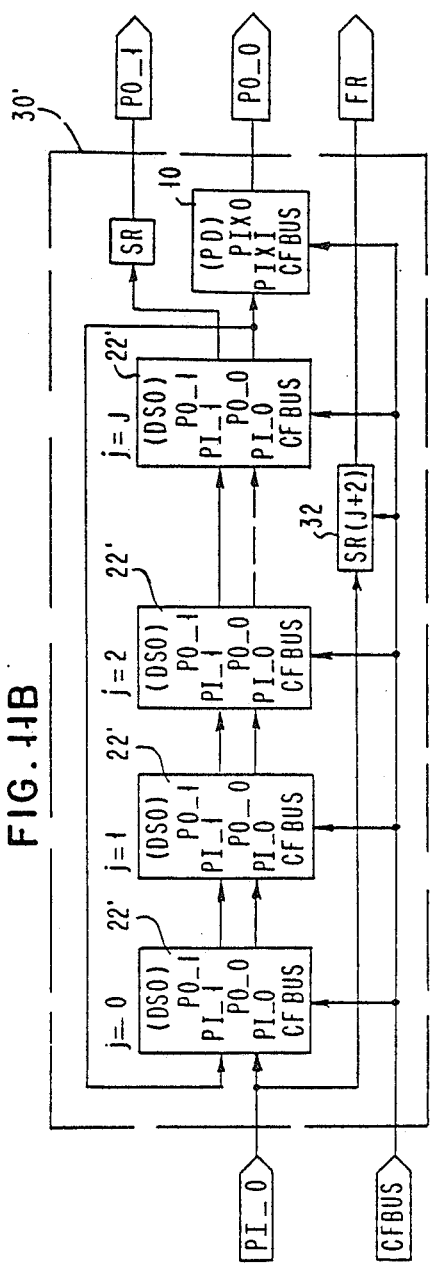
Figure 11C:
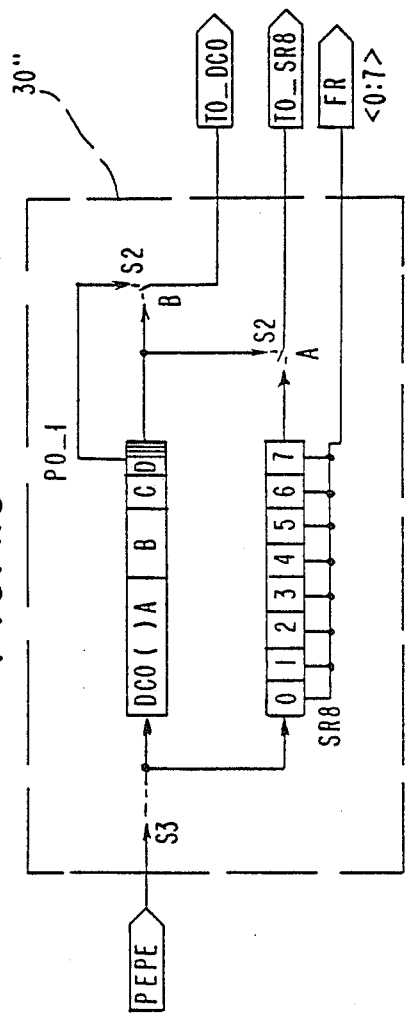

Referring to the delay chain 30' in FIG. 11B, it is possible to use unused memory delay in any delay chain. Input PI_0 is fed into the delay chain as before. The output of the Jth delay stage DS(J) is fed back to the PI_1 input of zeroth delay stage DS(0). The second path starting with PI_1 can be used to programmably build a second delay but only from the unused memory 20, if any, in each of the delay stages 22'. The arrangement is shown in FIG. 11C where the additional delay between two serially connected delay chains 30' is achieved with the addition of a second switch S2(B). A first path determines the delay between two adjacent shift registers SR8. A second path permits greater total delay between the second and third shift registers SR8 in a row.

The next step is to implement the embodiments for a VLSI chip.

Figure 12:
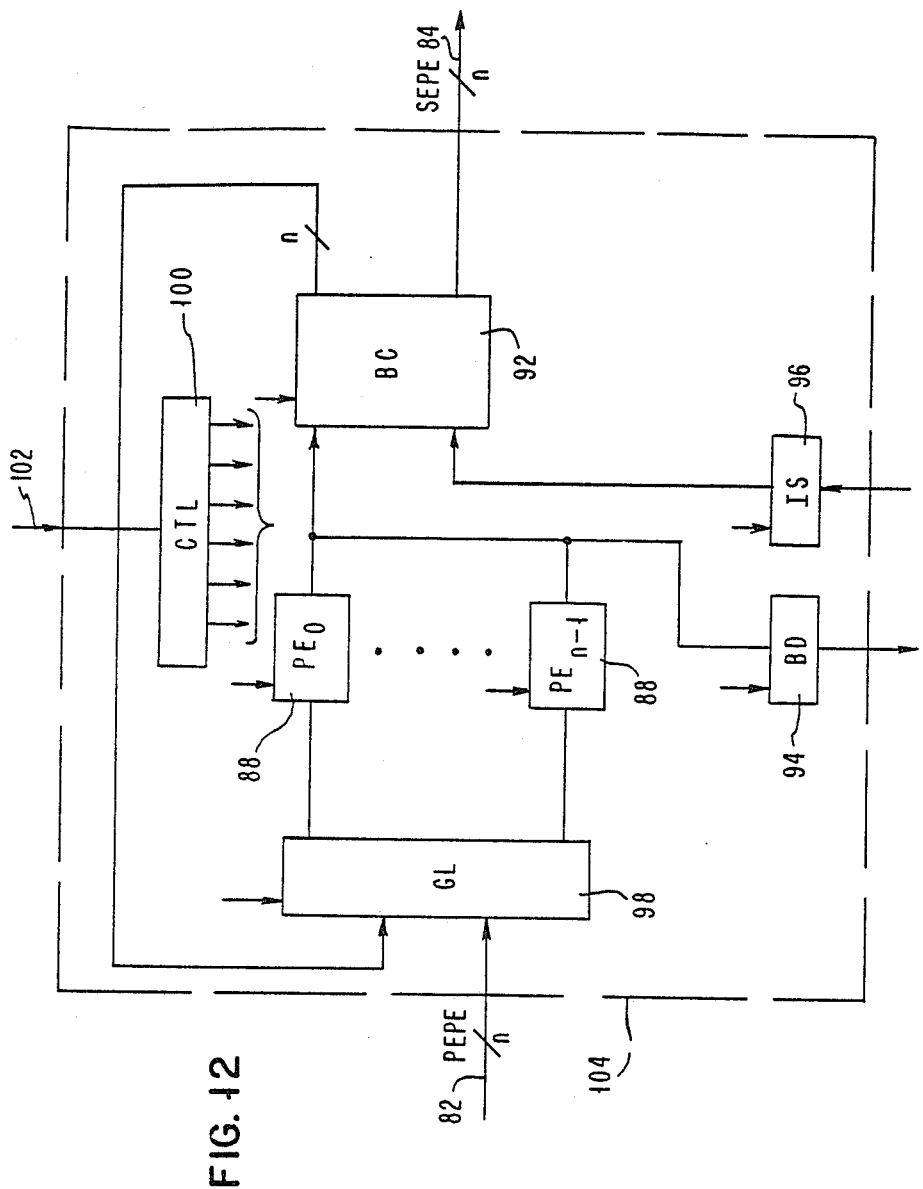
FIG. 12 is a schematic representation of a processing element group of the type used in a MITE system.

FIG. 12 shows schematically a processing element (PE) group 104 of the type used in the MITE system. The PE group comprises N processing elements 88, a boolean combiner 92, bus distribution logic 94, input selection logic 96, gating logic 98 and control logic 100. The description of the elements is found in patent application Ser. No. 06/759,640 and in the Kimmel et al article, supra. For purposes of understanding the present invention, each processing element 88 is reconfigurable by means of input signals from control logic 100 which, in turn, is initialized from a host computer via conductor 102. In a similar manner the LUTs, RAMs, window selection circuit and neighborhood size selection circuit contained in processing elements 88 are all reconfigurable from a host computer. Reconfiguring processing elements is well known in the art and a detailed description thereof is omitted for purposes of clarity. It is also known in the art that multiple processing element groups may be coupled together in the formation of reconfigurable network of parallel pipeline processors.

The inputs and outputs of the embodiment shown in FIG. 7 is the same as that in FIG. 12. However, by virtue of the present invention, the window for each processing element 88 is now a generalized neighborhood of any spatial pattern and the quantity of pixels comprising the window is variable. It will be obvious that for certain combinations of window span and window size, less than eight processing elements in a group will be configured.

In VLSI implementation there should be minimal input and output signals to and from the chip. To achieve this result, all logic for a processing element group (PEG) is placed on one chip. This is equivalent to the processing element group 35 in FIG. 7. The multibus interface for reconfiguration is made common to several PEGs to reduce I/O pins. This can be done by common configuration logic 110 (FIG. 13) which interfaces the multibus to the chips. With this one modification, PEG 35 is equivalent to PEG 104 (FIG. 12) in both function of the I/O and quantity of I/O pins. Along conductor 102 will be clocks, a chip select line, three command lines (shift, load LLUT, load BC), and a configuration data bus of approximately 8 bits. The outputs to the enumerator bus are a subset of the neighborhood window signals. The eight PEPE signals on conductor 82 and the eight SEPE signals on conductor 84 are still required. The total I/O for the division of hardware and basic system configuration described is between 64 and 72 pins for a chip.

An arrangement as shown in FIG. 13 is now possible. The total logic required is determinable from the quantity of RAM required for each chip or PEG 35. The amount of delay for each delay chain 30 must exceed the maximum offset (MAX) between successive neighbors in the neighborhood window. Thus, for a maximum separation of R rows in the image having an image width IW, with an N neighbor window, or $N-1$ delay chains, $MAX=N\times R\times IW$. Assuming an IW equal to $2^{11}$, R of two rows, and a nine neighbor window, a maximum total of 32K bits is required.

If each delay chain approximates 2K of delay, the nine rows of image delay requires 36k bits of RAM, organized as one 1k by 18, one 0.5k by 18, one 256 by 18 etc. The eight LLUT 40 require 1K each if the feedback bit is retained for a total of 8K bits of RAM. The boolean combiner is 4K by 16 (i.e., 12 inputs and 16 outputs-8 FEPE signals and 8 SEPE signals) or a total of 64K bits. The total RAM is thus 108K bits. Additional logic in the switches, window selection circuit and address counters etc. may add an additional ten or 20 percent to the total. The resulting logic is within the current state of the art. It is also possible by reducing the capability of the boolean combiner by deleting one or more inputs from the bus, to reduce the boolean combiner RAM in half or greater.

Therefore, it is possible to design eight processing elements into one VLSI chip by using one-eighth of the amount of delay hardware currently required. The function of the processing element groups is the same as in currently available systems when the image width is up to 2K. A limitation manifests itself when a wider image width or neighborhoods with greater than $2^{12}$ bits span are being processed. In such cases, fewer than eight processing elements can be configured within a single chip.

Having described a reconfigurable pipeline of generalized neighborhood function morphic image processors and variations thereon, it will be apparent to those skilled in the art that further modifications and variations are possible without deviating from the broad scope of the invention which shall be limited solely by the appended claims.

Having thus described my invention, what I claim as new, and desire to secure by Letters Patent is:

1. An apparatus for morphic image processing of an input image pixel stream by a generalized neighborhood function comprising:
   first memory means for receiving input image pixel stream and storing pixel values of the image pixel stream, said first memory means including a plurality of fixed delay elements containing image pixel values;
   processing means coupled to said first memory means for retrieving and processing predetermined ones of said stored pixel values corresponding to a generalized neighborhood function including first multiplexer means coupled to each one of said plurality of fixed delay elements for selecting and reordering a value from said fixed delay elements and second multiplexer means for receiving said selected and reordered value signals and providing plurality of further reordered value signals, and switch means coupled for receiving said further reordered signals for combining in a predetermined combination said further reordered signals to provide an output signal, whereby said first multiplexer means, said second multiplexer means and said switch means are reconfigurable corresponding o the generalized neighborhood function, and second memory means coupled to said processor means for receiving said output signal as an address for said second memory means for providing a neighborhood transformation signal of the input image pixel stream corresponding to the generalized neighborhood function each pixel time.

2. An apparatus as set forth in claim 1, said second memory means comprising a logic lookup table.

3. An apparatus as set forth in claim 2, wherein different said output signals address the same look-up table memory.

4. An apparatus as set forth in claim 1, said first memory means forming a portion of a processing element, said processing element being configurable corresponding to the generalized neighborhood function.

5. An apparatus as set forth in claim 4, said first memory means forming portions of a plurality of processing elements, each of said plurality of processing elements being configurable corresponding to the generalized neighborhood function.

6. An apparatus as set forth in claim 5, said processing elements being configurable with one another corresponding to the generalized neighborhood function.

7. An apparatus as set forth in claim 6, a plurality of said processing elements forming a processing element group, said group being implemented on a VLSI chip.

8. An apparatus as set forth in claim 1, said first memory means comprising a series of third memory means, each of said third memory means being in parallel with one of said fixed delay elements, whereby the image pixel values sequentially travel through a said third memory, means or its associated fixed delay element in a sequential manner in accordance with a preconfigured arrangement.

9. An apparatus as set forth in claim 1, wherein said processor retrieves a stored pixel value for the i+1th neighbor a predetermined quantity of pixels from a stored pixel value for the ith neighbor.

10. An apparatus as set forth in claim 1, wherein said plurality of fixed delay elements comprises a plurality of shift registers.

11. A method of morphic image processing of an input image pixel stream by a generalized neighborhood function comprising the steps of:

storing in a first memory means the pixel values of the input image pixel stream, retrieving and processing predetermined ones of the stored pixel values corresponding to a generalized neighborhood function including reordering the retrieved pixel values, further reordering the reordered retrieved pixel values and switching the further reordered pixel values for providing an output signal corresponding to the generalized neighborhood function, and addressing a second memory means responsive to the output signal for providing a neighborhood transformation signal of the input image pixel stream corresponding to the generalized neighborhood function each pixel time.

12. A method as set for in claim 11, wherein said retrieving and processing predetermined ones of the stored pixel values comprises retrieving a stored pixel value for the i+1th neighbor, a predetermined quantity of pixels from a stored pixel value for the ith neighbor of the generalized neighborhood function.

13. A method as set forth in claim 11, said second memory means being a logic look-up table.

14. A method as set forth in claim 13, wherein different said output signals address the same look-up table memory.

15. A method as set forth in claim 11, wherein said first memory means comprises a portion of a processing element and configuring said processing element corresponding to the generalized neighborhood function.

16. A method as set forth in claim 11, wherein said first memory means comprises portions of a plurality of processing elements and configuring each of said plurality of processing elements corresponding to the generalized neighborhood function.

17. A method is set forth in claim 16, and configuring said processing elements with one another corresponding to the generalized neighborhood function.

* * * * *